United States Patent
Adachi et al.

(10) Patent No.: US 6,469,755 B1
(45) Date of Patent: Oct. 22, 2002

(54) ILLUMINATING ARRANGEMENT WITH REFLECTOR HAVING INCLINED IRREGULARITIES OR CORRUGATIONS

(75) Inventors: Masaya Adachi; Ikuo Hiyama; Makoto Tsumura, all of Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/429,954

(22) Filed: Oct. 29, 1999

(30) Foreign Application Priority Data

Oct. 29, 1998 (JP) ............................................. 10-308760
Jul. 30, 1999 (JP) ............................................. 11-216344

(51) Int. Cl.$^7$ ......................................... G02F 1/1335
(52) U.S. Cl. ............................ 349/62; 349/65; 349/67; 349/70; 349/71
(58) Field of Search ........................ 349/62, 65, 67, 349/70, 71; 385/43, 146, 36

(56) References Cited

U.S. PATENT DOCUMENTS

| | | | | |
|---|---|---|---|---|
| 3,832,028 A | * | 8/1974 | Kapron | 385/43 |
| 4,915,479 A | * | 4/1990 | Clarke | 349/62 |
| 4,930,867 A | * | 6/1990 | Negishi | 359/834 |
| 4,991,918 A | * | 2/1991 | Owen et al. | 385/146 |
| 5,339,179 A | * | 8/1994 | Rudisill et al. | 349/65 |
| 5,359,691 A | * | 10/1994 | Tai et al. | 385/146 |
| 5,467,417 A | * | 11/1995 | Nakamura et al. | 385/36 |
| 5,485,291 A | * | 1/1996 | Qiao et al. | 349/62 |
| 5,973,833 A | * | 10/1999 | Booth et al. | 349/62 |

* cited by examiner

*Primary Examiner*—William L. Sikes
*Assistant Examiner*—Julie Ngo
(74) *Attorney, Agent, or Firm*—Antonelli, Terry, Stout & Kraus, LLP

(57) ABSTRACT

An illumination apparatus provides an improved light utilization efficiency and improved collimation. The illumination apparatus has a light guide, a collimating unit provided at least on one side of the light guide for collimating rays incident on the light guide, and a light source disposed in the vicinity of the collimating unit and surrounded by a reflector. Preferably, in order for the light guide to be able to emit collimated light uniformly from its emission surface, the light guide has inclined reflecting irregularities or stepwise reflecting plates which are provided directly or via an air gap on a back surface opposite to the emission surface thereof, wherein the inclined reflecting plates are specular-finished at least on the inclined portions.

20 Claims, 18 Drawing Sheets

ILLUMINATING ARRANGEMENT WITH REFLECTOR HAVING INCLINED IRREGULARITIES OR CORRUGATIONS

BACKGROUND OF THE INVENTION

The present invention relates to an illuminating apparatus for use in a liquid crystal display for television, a liquid crystal display for a computer and the like, which illuminating apparatus is provided in the back of a liquid crystal display device that displays a picture by modulating an optical state of light; and, in particular, the invention relates to an illumination apparatus having an improved and efficient collimating property and a liquid crystal display device using the same.

Recent technical developments and advancements the liquid crystal displays, and in particular, color liquid crystal displays, have been very remarkable, so that many types of color liquid crystal displays that feature a high performance display quality comparable to that of a cathode ray tube display are now on the market. Further, with the proliferation of note-type personal computers, any type of such liquid crystal display without provision of a back light illumination is not qualified for use as a commercial product, namely, the back light illumination is now an indispensable component in any direct-view-type color liquid crystal display device.

Generally, there are two types of color liquid crystal displays. One type is an active matrix driven twisted nematic (TN) liquid crystal display using thin film transistors (TFT), and another type is a multiplex driven super twisted nematic (STN) liquid crystal display. Both types of display are arranged to display pictures in such a manner that a polarizing plate, which is disposed on both surfaces of a liquid crystal device having its liquid crystal layer interposed between glass substrates, modulates the polarized state of linearly polarized light directed therethrough. More recently, various other types of displays have been proposed, such as ones using the selective reflection of cholesteric, controlling optical scattering and transmittance, optical absorption and transmittance or the like. The levels of brightness of the back light required in these note-type personal computers vary depending on their applications and specifications. However, for color note-type personal computers, it is mandatory to provide for a thin, light-weight design, with a low power consumption in addition to the requirement for a satisfactory brightness level. Still further, there is an increasing expectation for provision of a larger display screen, such as a computer display, using a liquid crystal device, and, therefore, it is necessary to provide for a display having a broader light emission property so as to provide a wider viewing angle, in addition to the provision of an improved brightness. Still more, there is a high expectancy for realization of a television having a larger display screen, wider viewing angle and a brighter liquid crystal display.

Thereby, there have been proposed and realized various methods for providing wider viewing angle liquid crystal displays, using TFTs, and operating in a multi domain vertical alignment nematic (MVA) mode, inplane switching (IPS) mode and the like. However, although these MVA and IPS modes have remarkably improved the viewing angle compared to the conventional TN, STN modes, they are associated with problems such as the occurrence of color changes and a drop in contrast ratio depending on its viewing angle and the like.

Other devices providing a wider viewing angle having no view angle dependency, which is realized on a screen which is disposed on a collimated light source and a liquid crystal display device, are disclosed in WO PCT/US94/07369, PCT/9-500981, PCT/9-505412, PCT/8-511129, PCT/9-507920, PCT/10-500528 and the like. Still other devices having screens and collimating technologies different from the above are disclosed in U.S. Pat. No. 2378252, WO PCT/US97/07374 (JPA Laid-open Nos. 6-202107 and 6-324217), respectively.

Still further, in a fluorescence color display disclosed in JPA Laid-open No. 60-50578 or in a liquid crystal display module disclosed in JPA No. 7-253576, color display devices are proposed which are comprised of an ultraviolet ray or near ultraviolet ray emitting light source; fluorescent materials for emitting red, green or blue color fluorescence disposed corresponding to liquid crystal display pixels by irradiation of ultraviolet rays; liquid crystal elements used as an optical shutter; and a color display unit for displaying a color picture by fluorescence of fluorescent materials. Still another color display unit is disclosed in JPA No. 9-80434, in which a blue color emission organic electroluminescence (EL) is used, and fluorescent material members which produce fluorescent red or green colors by irradiation of the blue light source are disposed in the form of a matrix.

Moreover, in the aforementioned display unit that uses fluorescent materials, its liquid crystal display elements function merely as an optical shutter for selectively allowing ultraviolet rays to pass, and its display is effected by fluorescence of a fluorescent material member disposed corresponding to a pixel through which ultraviolet rays have passed. Its fluorescence color is determined by a property of its fluorescent material, and a bright color rendering of red, green and blue becomes possible without absorption by a color filter, thus realizing a bright and clear color display. Still further, because a uniform spatial dispersion of light from the fluorescent materials is obtained without depending on the direction of the incident light, an improved display quality without a viewing angle dependency is realized.

The aforementioned collimating technology is associated with a problem in that its light utilization efficiency is substantially low. Further, an improved light utilization efficiency, which recently became available using a reflective polarizer based on the polarized light conversion technique disclosed, in U.S. Pat. Nos. 5486949, 5122906, SID 92 Digest p 427, JPA No. 7-36032, SID 95 Digest p 735, is insufficient and not suitable for the purpose of the invention. Still further, a construction using a prism sheet as an optical path converter which uses, for example, a brightness enhanced filter manufactured by 3M, has been disclosed for the purpose of improvement of forward directivity of light, however, its collimating property is low. Because of this low collimating property, when a wide viewing angle display is generated using fluorescent materials on a screen, unclear and bleeding color pictures are displayed due to the thickness of the glass substrates and the like.

SUMMARY OF THE INVENTION

The present invention is directed to a solution of the aforementioned problems, and is designed to provide an illumination apparatus and a liquid crystal display using the same that features a high efficiency collimating function such that an improved brightness and a wider viewing angle for a liquid crystal display can be realized. By provision of the illuminating apparatus that features an improved light utilization efficiency and a collimating function, it will become possible to realize a high brightness liquid crystal display, a wider viewing angle liquid crystal display, and a multiple liquid crystal display which displays a seamless picture on a plurality of liquid crystal displays which are aligned in a matrix array in combination without a gap.

A main object of the invention is to provide an illumination device having an improved collimating function which is realized by providing a collimating unit at a light incidence surface of a light guide, and to provide a bright liquid crystal display using the same. Another object of the invention is to provide a liquid crystal display which features a wider viewing angle by provision of a light spreading screen over liquid crystal elements. Still another object of the invention is to provide a large screen liquid crystal display system having a plurality of liquid crystal displays disposed without gap therebetween, each having a highly collimated illumination; a focus system disposed on the side of the display; a magnification system; and a screen. Still another object of the invention is to provide for a wide viewing angle and a brighter liquid crystal display having fluorescent members disposed in a matrix.

A liquid crystal display, which uses ultraviolet rays or near ultraviolet rays as a light source, and fluorescent members disposed in a matrix array has various advantages because of its monochrome light source. First of all, for a polarizer which uses a cholesteric liquid crystal layer and a retardation film, if the same is to be applied to a color liquid crystal display that uses a white light source, it is necessary for selective reflection to occur over the whole range of the visible light spectra. Otherwise, it is necessary for selective reflection to occur at least in its wavelengths corresponding to spectra of three primary colors of the light source.

However, because the actual Δn (birefringence) of cholesteric liquid crystal materials is approximately from 0.05 to 0.30, it is not possible for one layer of cholesteric liquid crystal material to provide for selective reflection in a broad range of wavelengths corresponding to a white light source. Therefore, in order to be able use a white light source, it is necessary to laminate a plurality of layers of cholesteric liquid crystal at a different pitch. However, when laminating the cholesteric liquid crystal layers, there occur problems of degradation in the property of the liquid crystal layer due to an increased number of interfaces and an increase in its production cost.

In addition, the retardation film used in the aforementioned polarizer has a function to convert a circularly polarized light that has passed through the cholesteric liquid crystal layer into a linearly polarized light. Therefore, in order to accommodate a white light source, it is necessary for the retardation film to be able to function as a quarter wave plate over the whole range of the visible light waves. However, generally it is impossible to construct a retardation film that can function as a quarter wave plate by provision of only one sheet thereof over the full range of the visible light waves due to its wavelength dependency (wavelength dispersion) as a result of the index of refraction of its constituting material.

In this case, it is possible to provide for a retardation plate which can function as a quarter wave plate over a wide range of wavelengths by laminating at least two different retardation plates having a different wavelength dispersion in such a way that their optical axes are arranged orthogonal to each other. However, there arises a problem in that a change depending on the angle of incidence of the light increases the in-phase differences of the retardation plates due to lamination of the retardation plates, thereby degrading its performance, now to mention the fact that the cost of manufacture increases.

On the other hand, in a color liquid crystal display which is comprised of an ultraviolet emitting light source, liquid crystal elements which are used as optical shutters, and fluorescent members which produce a fluorescent color display, because ultraviolet rays tend to be absorbed in its various transparent components, a highly efficient and bright color display as expected is not necessarily realized. Therefore, when the absorption by the various transparent components is considered, provision of a light source having a wavelength greater than 380 nm is preferable. More preferably, a light source having a wavelength greater than 430 nm, and a blue light of the three primary colors is preferably displayed using its light source color.

In particular, in case an edge backlight device is used as an illumination device, a light guide made of acrylic resin is provided for guiding light from a light source to a liquid crystal display device. However, because acrylic resin tends to absorb ultraviolet rays, it is difficult to efficiently guide ultraviolet rays to the liquid crystal display device using a light guide made of this material.

Still further, because the conventional polarizers now widely in use have a ultraviolet ray absorbent added to its protective film, most of the ultraviolet rays below 380 nm are absorbed (refer to FIG. 29). Further, with reference to FIG. 30, which shows transmittance spectra of wavelengths transmitting through liquid crystal display elements, except for the polarizer, most of the ultraviolet rays are absorbed in the transparent electrodes, alignment layers and the liquid crystal as well.

Because a large portion of the ultraviolet rays are absorbed in each part of the liquid crystal display device, as described above, it is very difficult for a high-efficiency color display device to be realized by the prior art. Still further, there occurs a problem in that the liquid crystal, alignment layers and the like are easily deteriorated by irradiation of ultraviolet rays depending on the property of their materials, thereby shortening their service life.

Still further, in the case where a liquid crystal layer of the liquid crystal display element and a fluorescent member to serve as a fluorescent emission part are disposed apart from each other, separated by a glass substrate and the like, the directivity of illumination of light (ultraviolet rays of irradiation) becomes low. Namely, when the parallelism or collimation of the light is low, the back-light illumination is allowed to stray to another fluorescent member corresponding to another pixel of the liquid crystal display different from a fluorescent member which is intended to be excited and displayed, thereby causing problems of color bleeding and deterioration of resolution. None of the aforementioned prior art considered or suggested any solution of these problems or how to improve the collimation of the illumination light.

The present invention is directed to a solution of such problems associated with the prior art, and is designed to provide an improved color display device which features an improved light utilization efficiency, improved brightness, minimized power consumption and improved quality of display without color bleeding or deterioration of resolution, realized by suppression of light absorption by color filters and/or polarizers.

In order to accomplish the objects of the invention, the following arrangements, devices, components and parts are employed.

According to one aspect of the invention for realizing an improved light utilization efficiency and improved collimation, an illumination apparatus is provided comprising: a light guide; a collimating unit provided at least on one side of the light guide for collimating incident rays to the light guide; and a light source disposed in the vicinity of the collimating unit and surrounded by a reflector. Preferably, in order for the light guide to be able to emit a collimated light uniformly from its emission surface, the light guide is comprised of inclined reflecting irregularities or stepwise reflecting plates which are provided directly or via an air gap on a back surface opposite to the emission surface thereof, wherein the inclined reflecting plates are specular-finished at least on their inclined portions. Alternatively, the light guide may be provided with inclined grooves on the emission surface thereof. More preferably, in order to be able to convert non-polarized light from the light source into a polarized light and to emit the polarized light uniformly, the light guide is provided with an irregular surface whereby light emitted from the light guide is emitted in a band, and further, a polarizing converter is provided on the light guide.

Still further, in order to be able to reduce the thickness of the illumination apparatus, an optical axis of the aforementioned collimating device is disposed so as to be tilted relative to the emission surface of the light guide. Here, the optical axis of the collimating device is defined as a peak direction of intensities of emission light f rom the collimating device.

Still more, in order for light emitted from the light source to efficiently enter into the collimating device, preferably, the light source is provided as a cylindrical light source, and the collimating device has a wide light incident opening at least along a major axis of the light source and along the light guide, and a narrow opening in the center portion of the light guide. Further, in case the light source is a spot light source, such as LED or the like, such a light source is arranged corresponding to each collimating device, and the collimating device has a narrow side on the side of the light source and a wide side on the side of the light guide. Still further, in order for light emitted from the light source to efficiently enter into the collimating device, a side wall of an expanded portion of the collimating device facing the light source is covered by a light reflecting plate.

Furthermore, a polarization converter is provided between the collimating unit and the light guide so that non-polarized light from the light source is converted to polarized light, thereby further improving its light utilization efficiency.

Still further, by providing liquid crystal display elements that display a picture by controlling a polarization state, scattering/transmittance, or absorption/transmittance of light, and arranging the illumination apparatus on the back side of the liquid crystal display elements according to the invention, a high brightness liquid crystal display device can be implemented. Further, by arranging a screen for spreading emitted light on the side of the display of the liquid crystal display elements, a liquid crystal display device having a high brightness and wide viewing angle can be implemented. Here, if a display mode is provided which ensures that the liquid crystal display elements will have a sufficient contrast ratio relative to an incident angle of light within a range of light emission angles for the light source, a wide viewing angle display free from a change in its contrast ratio depending on its viewing angle, gradation reversal, and color changes can be obtained.

Still more, by provision of a plurality of the liquid crystal display units using an illumination device having an improved collimating property according to the invention, and by disposing on the side of its display screen a focusing system formed by a microlens array etc., a magnifying unit formed by a frennel lens etc., and preferably a bead screen which has a function to absorb-external light and spread its emission light, a large display screen liquid crystal display system featuring a seamless and a broad viewing angle display can be implemented. An example of such a bead screen is disclosed, for example, in U.S. Pat. No. 2,378,252, and has a function to absorb external light efficiently and transmit emission light from the liquid crystal display elements efficiently.

Further, according to still another aspect of the invention, a liquid crystal display system is provided, which is comprised of a pair of transparent substrates disposed at a preset gap with their transparent electrode forming surfaces being placed opposite to each other; a liquid crystal layer interposed between the pair of transparent substrates; a liquid crystal display element provided with a voltage application part for applying a voltage in response to a picture signal to a pixel in a matrix formed by transparent electrodes on the pair of transparent substrates; a light source for emitting a back light to illuminate the back surface of the liquid crystal display element, the wavelength of the emission peak of which is from 380 to 500 nm; and fluorescent material members of one or more species for converting wavelengths for converting the light from the light source into red or green colors, which are disposed corresponding to each pixel of the liquid crystal display element on the side of light emission of the liquid crystal layer of the liquid crystal display element, wherein the aforementioned liquid crystal display element has a polarizer provided at least on the side of light incidence such that a polarization state of incident light to the liquid crystal layer is utilized to display a picture, and wherein, by disposing the illumination device on the back surface of the liquid crystal display element, an improved liquid crystal display system free from an absorption loss by the color filters is realized.

Further, by adopting a light for the light source having an emission peak wavelength of 430 to 480 nm, a transmittance factor of constituting components and parts, such as glass substrates, polarizers, liquid crystals and the like, can be substantially improved, thereby realizing a greatly improved high brightness liquid crystal display system.

It should be noted that in the color display device having such arrangements as described above, the light to be emitted from the light source and to be modulated in the liquid crystal display element is a monochrome (blue) light having a narrow band region. Therefore, the functions of a polarizing splitter, which is a cholesteric liquid crystal layer, the polarizing splitting capability of a linearly polarizing splitting element, or a phase retardation plate of the polarization converter become higher than in a case of white light which has a broader band region.

Therefore, the non-polarized light from the light source is converted more efficiently than the prior art into a preferred linearly polarized light, namely, into a linearly polarized light, the oscillation direction of electric vectors of which is identical with the linearly polarized light transmittance axis of a polarizer which is disposed on the back side of the liquid crystal display element, and then is irradiated on the liquid crystal display element. Thereby, most of the light incident on the liquid crystal display element contributes to the purpose of the display without being absorbed in the polarizer, thereby more efficiently utilizing the light from the light source without wasting light due to absorption by the polarizer.

Still further, the liquid crystal display element of the invention functions as an optical shutter for allowing only a blue color of the light source to be selectively transmitted therethrough, and the display of green and red colors are enabled by fluorescence of fluorescent material members which are patterned at respective positions corresponding to respective pixel colors. Further, display of the color blue is enabled by light transmitted through a blue color filter which is patterned corresponding to the positions of blue color pixels. However, because the light source is a blue color emission source, there will occur no loss of transmittance through the blue color filter. Thereby, a bright color display device is provided featuring an improved light utilization efficiency and no loss of light transmittance through the color filters compared to the prior art.

Still more, because back-light illumination light emitted from the light source is collimated in omnidirections effected by the inclined reflecting surface formed in the bottom surface of the light guide and the optical path conversion device, even if the liquid crystal layer of the liquid crystal display element and the fluorescent members of the wavelength converter are separated by the glass substrate from each other, the straying of light of the illumination light from its destined fluorescent member corresponding to a pixel to be energized is minimized, thereby suppressing the occurrences of color bleeding, and deterioration of the resolution, so as to provide for an improved and enhanced quality of color display.

Still further, because the excitation source light (light source) for use in the fluorescence display produces visible light, it is not absorbed by various transparent materials used in the liquid crystal display element as the ultraviolet rays were absorbed, the light from the light source is most efficiently utilized, and no deterioration of the polarizers, liquid crystal material or the like by ultraviolet rays occurs, thereby providing for a long service life fluorescent color display device.

Furthermore, in the color display device according to the invention, a band pass filter is provided at a portion of the wavelength converter where no blue color filter is pattern-formed, namely, at a portion where the fluorescent member is pattern-formed, and at a position in the upper direction of the fluorescent member near to the viewer, this band pass filter allows emission spectra of the red and the green color emission fluorescent members to pass, and cuts off other spectra of light.

In this case, because excitation light contained in external light is absorbed in the band pass filter, no enhanced brightness black color display occurs due to excitation of the fluorescent members. Further, red and green colors generated by fluorescence of the fluorescent members are allowed to pass through without being absorbed in the band pass filter, and the blue color for which no band pass filter is provided in its blue color filter section can contribute wholly to the purpose of the display without absorption, thereby providing for a substantially improved contrast ratio even under day-light or illuminated circumstances.

Still further, by provision of a reflecting layer on the back surface of the wavelength converter (on the side of the liquid crystal display element) which allows the emission spectra from the light source to pass, but reflects other incoming visible light, a loss of light due to return of scattered light produced by fluorescence from the fluorescent members to the liquid crystal display element can be minimized, or deterioration of the display quality, such as color bleeding and the like, due to stray light can be eliminated, thereby realizing an improved color display device featuring a brighter display quality.

BRIEF DESCRIPTION OF THE DRAWINGS

The invention will be more particularly described with reference to the accompanying drawings, in which.

PREFERRED EMBODIMENTS OF THE INVENTION

Embodiment 1

Figure 1:
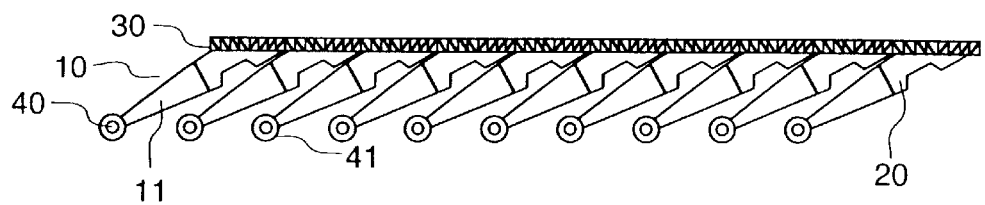
FIG. 1 is a cross-section of an illumination apparatus according to one embodiment of the invention.

An illumination apparatus according to a first embodiment of the invention, as typically indicated in FIG. 1, features a high light utilization efficiency and a high collimation capability. This illumination apparatus, representing a first embodiment of the invention, is comprised of a light guide device 10, which includes a light guide member 20 made of transparent acrylic resin, and a collimator 11 which is juxtaposed to one side of the light guide member 20; a light source 40 in the form of a cold cathode fluorescent lamp for emitting light having an emission length corresponding to the length of the light guide member 20, which is disposed at one end of the light guide device 10; a reflecting plate 41 which surrounds the cold cathode fluorescent lamp 40 for reflecting and guiding the light into collimator 11; and a polarization converter 30 which is disposed on the emission surface side of the light guide member 20. The light source 40 has a tube diameter of 2.2 mm and a tube length of 292.5 mm (in the depth direction in FIG. 1). Reflecting plate 41 is formed into a cylinder or elliptic cylinder to surround the cold cathode fluorescent lamp. Light guide member 20 has an index of refraction of 1.49, and a size of 292.5 mm×21.5 mm×12.4 mm (at the side of light source 40; 1.0 mm at the opposite side). A back side surface of the light guide member 20 is formed to have an inclined surface to serve as a reflector such that emission light f rom collimator 11 is caused to reflect and to be emitted in a band which matches the pitch of polarization converter 30 disposed at its emission surface. According to this embodiment of the invention, ten units of this light guide device 10 are arranged to be provided for the illumination apparatus. However, the number of light guide devices 10 is not limited thereto, and any number thereof can be arranged according to thickness and the number of lamps used in illumination apparatus.

Figure 2:
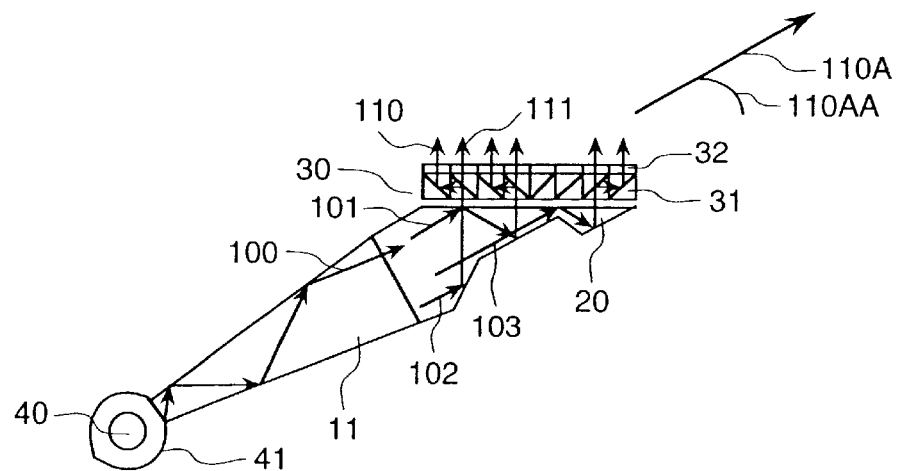
FIG. 2 is a cross-section of one of the light guide devices used in the illumination apparatus of FIG. 1.

With reference to FIG. 2, one block of the light guide device 10 used in this embodiment of the invention is illustrated. An optical axis 110A of collimator 11 is set at an angle of 30 degrees, as indicated by angle 110AA relative to an emission surface of light guide member 20. By setting angle 110AA at 30 degrees, the back surface of the light guide member 20 can be formed to have a rather flat reflecting portion. However, optical axis 110A is not limited to 30 degrees, and when the angle 110AA changes, one can cope with such change by changing the back surface shape of the light guide member 20 accordingly. It should be noted, however, that at 90 degrees of angle 110AA, the thickness of the illumination apparatus becomes substantial, and that when the angle 110AA becomes greater or smaller than 30 degrees, the shape of the back surface of the light guide member 20 becomes complicated.

Figure 3:
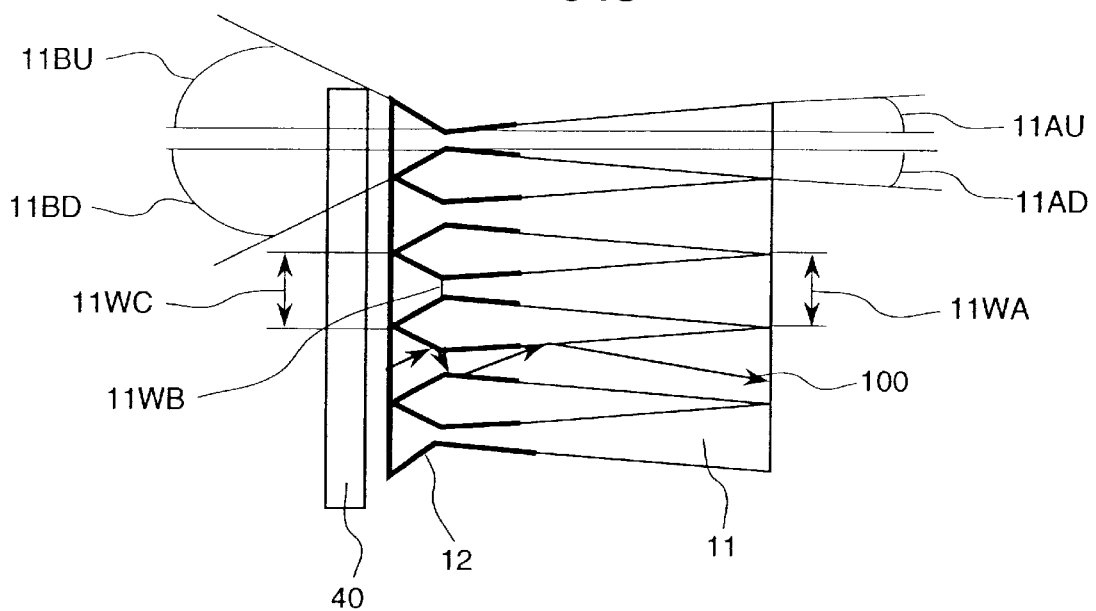
FIG. 3 is a cross-section of the collimators used in the illuminating apparatus of FIG. 1.

As indicated in FIG. 3, collimator 11 has an expanded structure both on the side of light source 40 and on the side of light guide member 20, as viewed from its emission side. In this embodiment of the invention, collimator 11 is made of a transparent acrylic resin, which is the same material used for light guide member 20, and is formed integral with light guide member 20. However, the invention is not limited thereto, and they may be molded separately and optically coupled thereafter. In FIG. 3, only four units of collimator 11 are indicated, but in practice, they are arranged corresponding to the length of light source 40, and actually 40 units thereof are arrayed based on a width of 7.4 mm of 11WA in FIG. 2. Further, each surface of light guide member 20 and collimator 11 is specular-finished. Still farther, a reflector 12 is provided on a part of the side surfaces of the collimator 11.

As viewed from the above, as seen in FIG. 3, this collimator 11 is formed to have an incidence port 11WC which is 7.4 mm, a center port 11WB which is 2.8 mm and an emission port 11WA which is 7.4 mm. Further, the tilt angles 11BU, 11BD at the incidence port are set at approximately 21 degrees, and tilt angles 11AU, 11AD at the emission side are set at 5.1 degrees. However, the tilt angles 11BU, 11BD need not be equal if they are preferably smaller than 45 degrees. Still further, the angles 11AU, 11AD need not be equal if they are preferably smaller than 15 degrees. Alternatively, by varying the angles 11AU and 11AD, the direction of directivity can be varied. It should be noted, however, that the respective tilt angles are not limited thereto, if its center portion has a narrowed construction.

Figure 4:
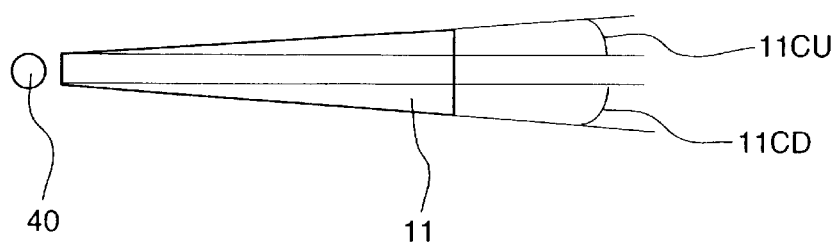
FIG. 4 is a cross-section of the illuminating apparatus according to one embodiment of the invention.

A cross-section of this collimator, as indicated in FIG. 4, has tilt angles 11CU, 11CD set at 5.0 degrees provided at the emission side.

By provision of the aforementioned construction, light emitted from the light source 40 undergoes a total reflection on the internal surface of the collimator 11, as indicated in FIG. 2, and is collimated into light 100 which enters into light guide member 20. Thereby, the collimation of the light can be enhanced. Emission 101, 102, 103 from collimator 11 has been collimated approximately within ±8 degrees relative to the optical axis 110A. Collimated rays are reflected directly on the back surface of light guide member 20, or after being totally reflected on the emission surface thereof, they are reflected on the back surface thereof to enter a polarization converter 30. The incident light which enters the polarization converter 30 is split into polarized light and S polarized light, which are converted by retardation film 32 into same linearly polarized light 110 and 111, respectively. Here, as a polarization splitter 31, double brightness enhanced filters (DBEF), which are reflecting type polarizers made by 3M, are pasted on planes which are inclined at 45 degrees, and arranged such that P polarized light is reflected, while S polarized light is allowed to pass therethrough. Although a polarization axis is specified for preventing changes in colors by tilt incidence of light on the DBEF, the device is not limited to this polarization axis if adjusted to a 45 degree angle incidence. In this embodiment of the invention, in order to allow for emission of the polarized rays from the illumination apparatus, polarization converter 30 is disposed on the light guide member 20 as indicated in FIGS. 1 and 2. Here, as a polarization splitting film, a reflection polarizer made from a dielectric multi-layered film as disclosed in SID92 Digest, p427, U.S. Pat. Nos. 5,486,949, and 5,122,906, or a reflection polarizer which utilizes selective reflection of a cholesteric may be used as well. Further, a polarization splitter formed by a deposition film for use of a projector may also be used. By use of this polarization converter 30, the light utilization efficiency for polarized rays has been increased as much as 1.7 times greater than the case without polarization converter 30.

In the cross-section of the structure of FIG. 3, a size of 11WC at the incident side of collimator 11 is the same as a size of 11WA at the emission side thereof, therefore, there is no component of light from the lamp which does not enter the collimator 11 (although there exists a component of light which returns toward the lamp). Thereby, the incidence efficiency of light into collimator 11 is substantially improved. In the case where reflector 41 and light source 40 are directly coupled without provision of a collimator 11, the incidence efficiency of light into light guide member 20 was approximately 80% with respect to the light flux of light source 40. According to this embodiment of the invention, approximately 60% of incidence efficiency of light into light guide member 20 was obtained. In this embodiment of the invention, if an expanded portion of collimator 11 from 11WB toward light source 40 is eliminated, and a reflector is disposed in the gap left by 11WB, the incidence efficiency of light into the light guide was approximately 40%, thereby proving that by provision of the expanded portion on the side of lamp, a significant improvement in the incidence efficiency of light has been realized. If the incident portion of collimator 11 (from 11WB toward light source 40) is not provided, incident rays to collimator 11 are totally reflected and directed into light guide 20. However, according to this embodiment of the invention, because there exists an incidence angle of the enlarged portion which does not allow a total reflection, a reflector 12 is provided.

The cross-section of collimator 11 viewed from its side, as indicated in FIG. 2, is shown to have a trapezoid form. However, if the diameter of light source 40 becomes large relative to the incidence portion of collimator 11, its light incidence efficiency can be improved by expanding the incidence portion in the direction of the height thereof according to the diameter of the light source.

The collimating capability obtained by this embodiment of the invention is as follows. When considered in terms of half value widths of the emission light (a range of angles at which the brightness becomes ½ of its peak brightness), approximately ±12.5 degrees and ±12.0 degrees are obtained in the depth direction and the horizontal direction of the plane of FIG. 3, respectively. Thus, an improved illumination apparatus featuring a high collimation capability and a high illumination utilization efficiency has been obtained.

According to this embodiment of the invention, ten sets of light sources 40 are arrayed, but the invention is not limited thereto, and any number of light sources 40 may be provided in consideration of the brightness required, the power consumption and the thickness thereof Still further, the light collimating capability can be adjusted by varying the tilt angles 11AU, 11AD, 11CU, 11CD and the widths 11WA, 11WB, 11WC of the collimator 11.

Embodiment 2

Figure 5:
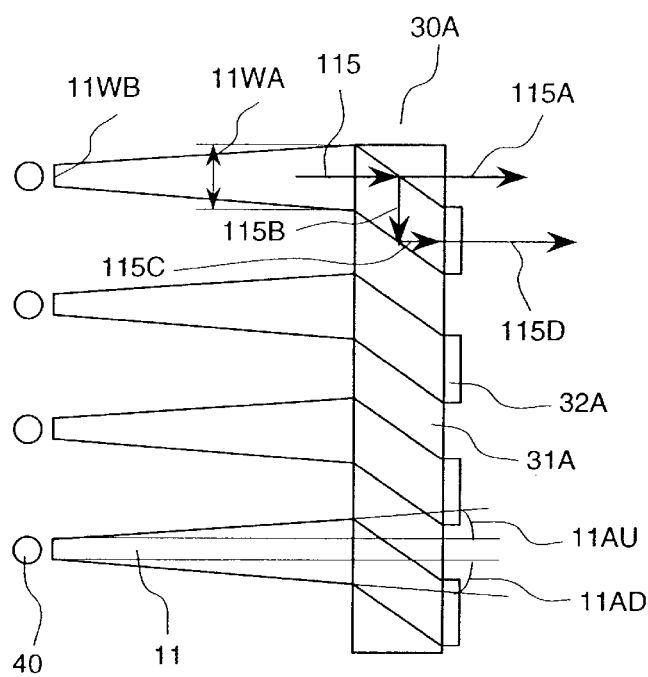
FIG. 5 is a cross-section of light guide devices used in the illuminating apparatus according to another embodiment of the invention.

In this second embodiment of the invention, instead of the cylindrical cold cathode fluorescent lamp or hot cathode fluorescent lamp used in the first embodiment of the invention, a plural number of a spot light sources 40 such as LEDs are arrayed as indicated in FIG. 5, and a plural number of collimators 11 are respectively associated with the LEDs. A major difference between the first embodiment and the second embodiment of the invention resides in the fact that a spot light source in the form of an LED is used and a polarization convertor 30A is interposed between each collimator 11 and a light guide 20. FIG. 5 is a cross-section as viewed from an emission side of the light guide, which corresponds to FIG. 3 brightness of the black color in the display is increased, and its contrast ratio is not deteriorated according to the invention.

Further, a polarization converter 30 provided on the emission side has a polarizing splitter film which allows S polarized light 115A of non-polarized light 115 to pass therethrough and reflects P polarized light 115B thereof. The light 115B is again reflected on the polarizing splitter film as indicated by 115C, and the light 115C is then converted to S polarized light 115D by a retardant film or a rotary polarizer serving as a half wave plate provided on the emission side thereof, thereby efficiently converting all of the non-polarized light into a linearly polarized light. The polarization converter used in this embodiment is the same as that used in the first embodiment of the invention.

When reflector 41 and light source 40 are directly coupled to light guide 20 without provision of collimator 11, approximately 80% of the same incidence efficiency is obtained.

The collimating performance obtained by the second embodiment of the invention, in terms of half value widths of light of emission (a range of angles at which a brightness becomes ½ of its peak brightness), is approximately ±12.0 degrees and ±12.0 degrees in the depth direction and the horizontal direction, respectively, relative to the plane of FIG. 1. Thereby, an improved illumination system which features a high collimation capability and an improved light utilization efficiency is obtained according to the invention.

Embodiment 3

Figure 6:
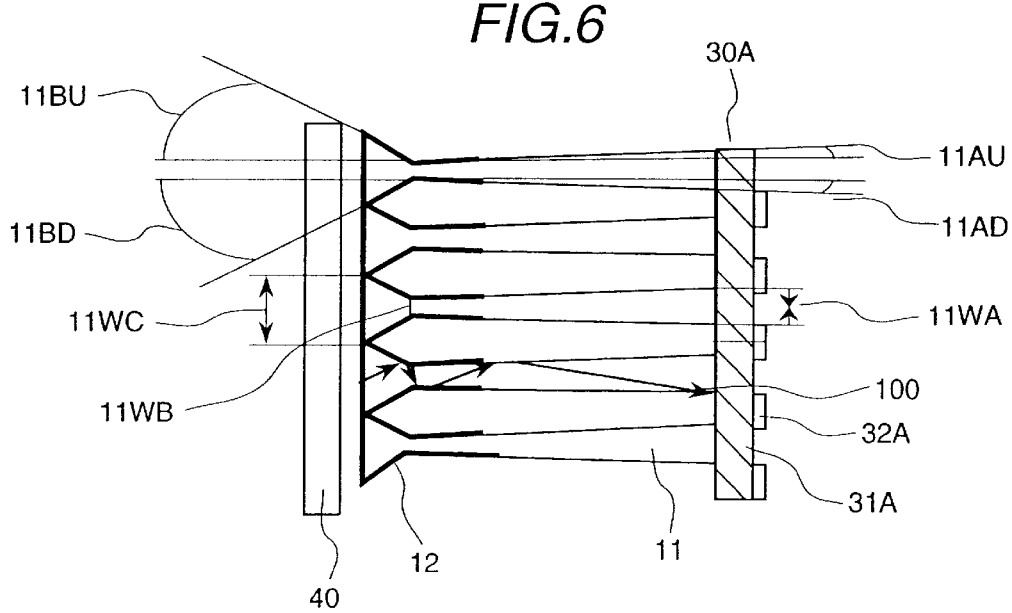
FIG. 6 is a cross-section of the collimators used in the illuminating apparatus according to another embodiment of the invention.

A major difference of the third embodiment from the first embodiment of the invention resides in the fact that a polarization converter 30 is interposed between collimator 11 and light guide 20. FIG. 6 is a cross-section as viewed from the emission side of the light guide and corresponds to FIGS. 3 or 5. This collimator 11, as seen from the above in FIG. 6, has an incidence portion 11WC facing light source 40 set at 7.4 mm, a center portion 11WB set at 2.8 mm, and an emission portion 11WA set at 7.4 mm, respectively. Further, the tilt angles 11BU, 11BD at the incidence portion are set approximately at 21 degrees, and the tilt angles 11AU, 11AD at the emission portion are set at 5.1 degrees. Tilt angles 11BU, 11BD are not limited to these exemplary values, and they need not be equal to each other if they are smaller than preferably 45 degrees. Further, angles 11AU and 11AD need not be equal to each other if they are smaller than preferably 15 degrees. Alternatively, by changing the angles 11AU and 11AD, the direction of directivity can be changed. However, it is noted that the respective tilt angles are not limited thereto, as long as the center is formed to have a narrowed portion.

In the structure indicated in the cross-section shown in FIG. 6, because the size of 11WC on the incidence side of collimator 11 and the size of 11WA on the emission side thereof are not the same, there will be no components of light from the light source that do not enter into collimator 11 (although there exists a component of light that returns toward the lamp), thereby improving the light incidence efficiency into collimator 11. In the case where reflector 41 and light source 40 are directly coupled to light guide 20 without providing collimator 11, the light incidence efficiency to light guide 20 was approximately 80% relative to the flux of light emitted by light source 40. However, according to this embodiment of the invention, approximately 60% of light incidence efficiency to light guide 20 was obtained. In this embodiment of the invention, when a portion of collimator 11 from 11WB toward light source 40 is removed and a reflector is disposed in the gap left by 11WB, the light incidence efficiency into the light guide is about 40% thereby proving that by provision of an enlarged incidence portion facing the lamp, the light incidence efficiency can be improved remarkably. Without the provision of the incidence portion (from 11WB toward light source 40) in collimator 11, rays incident on collimator 11 undergo total reflection therein and are directed into light guide 20. However, in this embodiment of the invention, because angles of incidence exist that do not allow for the total reflection when the incidence portion is enlarged, the reflector 12 is provided.

Further, the polarization converter 30 comprising polarization splitter 31A and retardation film 32A is disposed on the side of emission of collimator 11 in the same manner as in the second embodiment of the invention, such that all of the non-polarized rays of light are converted efficiently into linearly polarized light. The polarization converter used in the third embodiment of the invention is the same as one used in the first embodiment of the invention.

The collimating property obtained according to this embodiment of the invention is measured in terms of half value widths of emission of light (a range of angles at which a brightness becomes ½ of its peak brightness), and is obtained to be approximately ±12.5 degrees and ±12.0 degrees, respectively, in the depth direction and the horizontal direction relative to the plane of FIG. 1. Thereby, an improved illumination system featuring an enhanced collimating property and a high efficiency light utilization is obtained.

Embodiment 4

Figure 13:
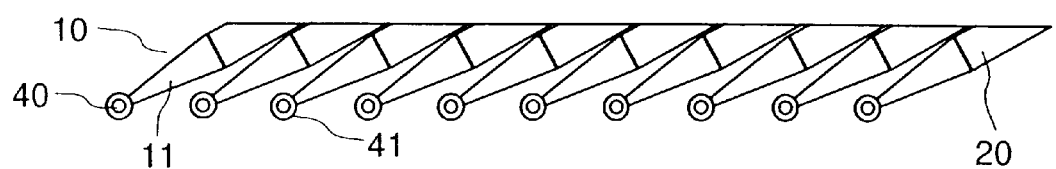
FIG. 13 is a cross-section of an illumination apparatus according to another embodiment of the invention.
Figure 14:
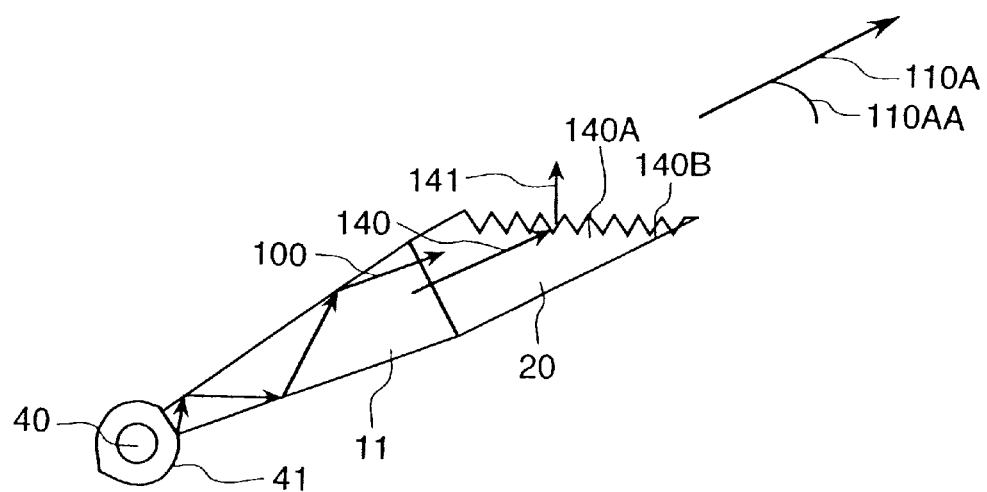
FIG. 14 is a cross-section of one of the light guide devices used in the illumination apparatus if FIG. 13.

With reference to FIGS. 13 and 14, a fourth embodiment of the invention will be described. A major difference of the fourth embodiment from the first embodiment of the invention resides in the fact that polarization converter 30 is eliminated, the back surface of light guide member 20 is formed into a flat specular surface, and its light emission plane is formed to have a triangle-groove structure, as shown in FIG. 14. In FIG. 13, a plurality of light guide devices 10 according to this embodiment (indicated in FIG. 14) are arranged in the same manner as in the first embodiment of the invention. In this embodiment, angle 110AA relative to the emission plane of optical axis 110A of collimator 11 is set at 30 degrees as in the first embodiment of the invention. In this structure, a tilt angle of groove 140A is specified to be 60 degrees so as to form isosceles triangles, a pitch therebetween is set at 100 μm, and a reflector 140B is formed on the right-hand tilt plane thereof. Here, in order for the light emitted from the light guide device 10 to be emitted in a vertical direction relative to the emission plane thereof, tilt angle 140A of the groove is preferably set at a value which is obtained by dividing by two a sum of angle 110AA of optical axis 110A of collimator 11 and 90 degrees.

Thereby, collimated light 140 from collimator 11 is allowed to pass through the triangle groove, but is reflected on the reflector 140B on the right-hand side of the groove so as to be emitted as a light of emission 141 and 142 corresponding to light 111 and 110 of FIG. 2.

The collimation property obtained according to this embodiment of the invention, as evaluated in terms of half value widths of light of emission (a range of angles at which its brightness becomes ½ of the peak brightness), is approximately ±12.5 degrees and ±12.0 degrees, respectively, in the depth direction and the horizontal direction relative to the plane of FIG. 13. Thereby, a high performance illumination apparatus featuring an enhanced collimation and light utilization efficiency has been obtained.

Embodiment 5

Figure 15:
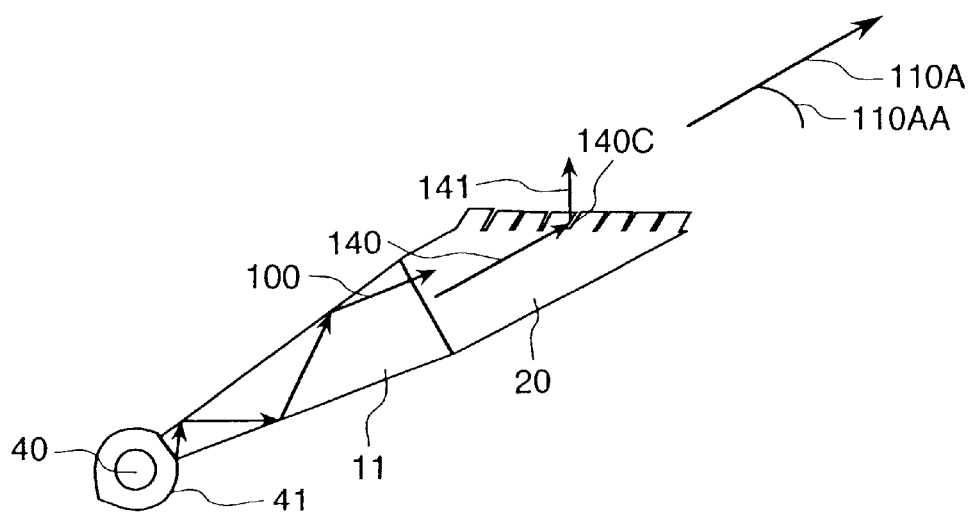
FIG. 15 is a cross-section of another form of light guide device used in the illumination apparatus of FIG. 13.

With reference to FIGS. 13 and 15, a fifth embodiment of the invention will be described. A major difference of the fifth embodiment from the first embodiment of the invention resides in the fact that polarization converter 30 is eliminated, the back surface of light guide member 20 is formed into a flat specular-finished surface, and its emission plane is formed to have a groove structure as indicated in FIG. 15. FIG. 13 shows can arrangement of a plurality of light guide devices 10 indicated in FIG. 15 in the same manner as in the first embodiment of the invention. In this embodiment of the invention, angle 110AA of optical axis 110A of collimator 11 relative to the emission plane of the light guide is set at 30 degrees similar to the first embodiment of the invention. In this case, the tilt angle 140C of the groove is set to be 60 degrees, and the pitch therebetween is set to be 200 μm. Here, the tilt angle 140C of the groove is preferably set to a value obtained by dividing by two a sum of angle 110AA of optical axis 110A of collimator 11 and 90 degrees.

Thereby, a collimated light 140 from collimator 11 is totally reflected on a tilt plane of the groove to be emitted as a light of emission 141. Therefore, since total reflection is provided by the tilt plane of the groove, the index of reflection thereof can be increased to a greater extent than in the embodiment 4.

The collimation property obtained according to this embodiment of the invention, as evaluated in terms of half value widths of light of emission (a range of angles at which its brightness becomes ½ of the peak brightness), is approximately ±12.5 degrees and ±12.0 degrees, respectively, in the depth direction and the horizontal direction relative to the plane of FIG. 13. Thereby, an improved illumination system featuring an enhanced collimation capability and a high efficiency light utilization has been provided.

Embodiment 6

Figure 16:
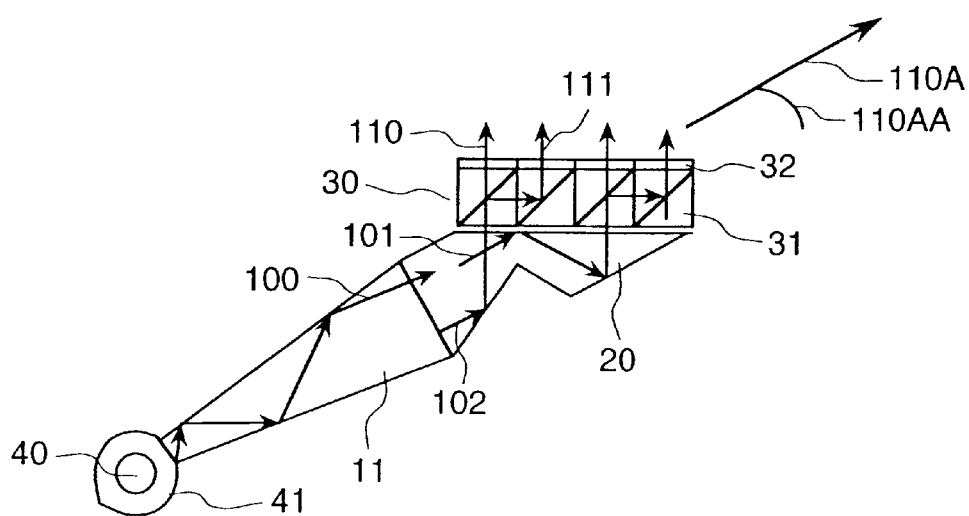
FIG. 16 is a cross-section of a light guide device for an illumination apparatus according to another embodiment of the invention.

A sixth embodiment of the invention will be described with reference to FIGS. 1 and 16. A major difference of the sixth embodiment from the first embodiment of the invention resides in that a number of divisions of the polarization converter 30 is different therebetween. The number of divisions of the polarization splitters is set at 4 in this embodiment, while the number of division thereof is set at 8 in the first embodiment.

The collimating property obtained according to the sixth embodiment of the invention, as evaluated in terms of half value widths of light of emission (a range of angles at which its brightness becomes ½ of the peak brightness), is approximately ±12.5 degrees and ±12.0 degrees, respectively, in the depth direction and the horizontal direction relative to the plane of FIG. 1. Thus, an improved illumination apparatus featuring an enhanced collimating performance and high utilization efficiency of light is realized.

The light utilization efficiency according to this embodiment of the invention has been improved more than 5% compared to that of the first embodiment. This is partly because the optical alignment with the polarization converter 30 becomes easier. The number of divisions of the polarization converter 30, however, is not limited to four, and any even number may be adopted.

Embodiment 7

Figure 17:
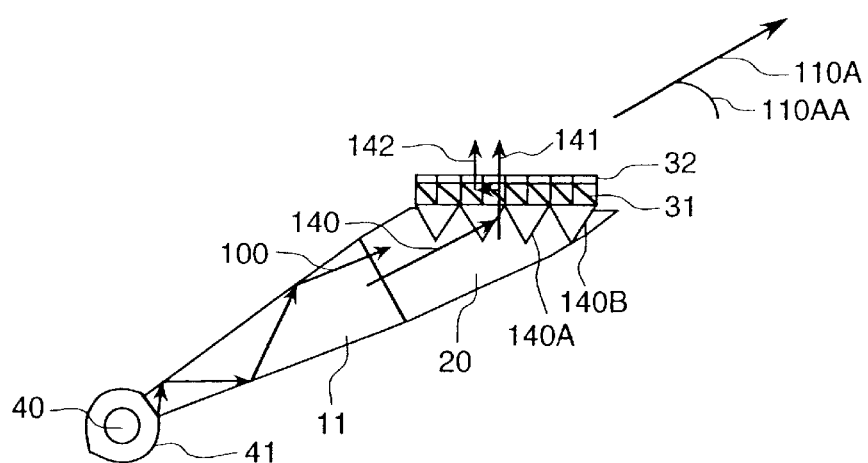
FIG. 17 is a cross-section of a light guide device for an illuminating apparatus according to another embodiment of the invention.

A seventh embodiment of the invention is indicated in FIGS. 1 and 17. A major difference of the seventh embodiment from the first embodiment of the invention resides in the fact that while in the first embodiment linearly polarized light of emission in a band flux is effectuated by the inclined back-surface structure, in the seventh embodiment of the invention the light of emission in a band flux is effectuated by an emission plane of its light guide member.

The collimating property obtained according to the seventh embodiment of the invention, as evaluated in terms of half value widths of light of emission (a range of angles at which its brightness becomes ½ of the peak brightness), is approximately ±12.5 degrees and ±12.0 degrees, respectively, in the depth direction and the horizontal direction relative to the plane of FIG. 1. Thus, an improved illumination apparatus featuring an enhanced collimating performance and high utilization efficiency of light is realized.

Further, light guide member 20 of FIG. 15 may be adopted in this embodiment as well. Also, the number of divisions of its polarization converter 30 may be any number so long as it is an even number.

Embodiment 8

Figure 7:
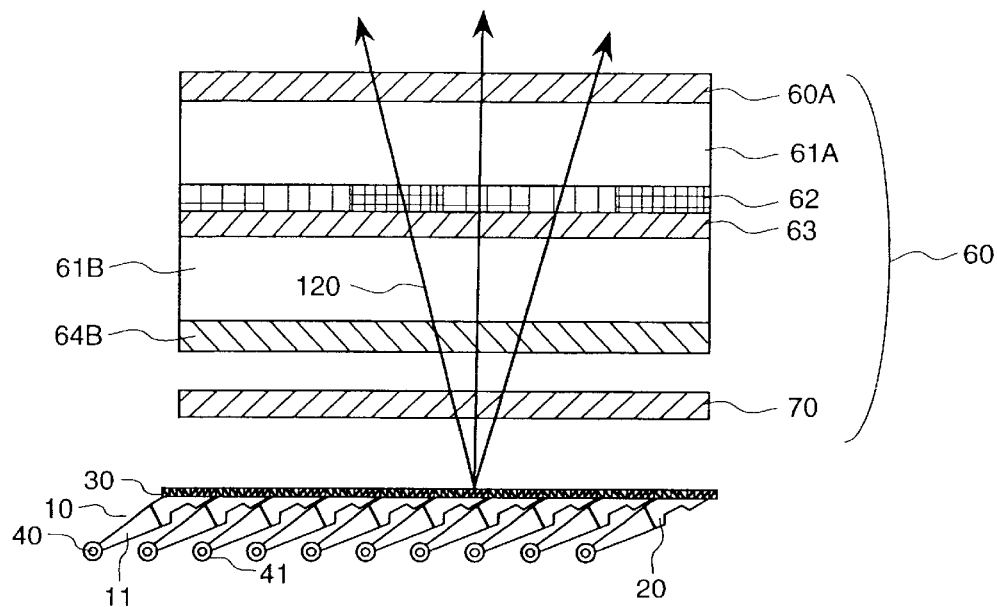
FIG. 7 is a cross-section of a liquid crystal display device according to one embodiment of the invention.

An eighth embodiment of the invention relates to a liquid crystal display device that has adopted the illumination apparatus according to the invention, typically one of the first to the seventh embodiments. The eighth embodiment of the invention will be described by way of example with reference to the first embodiment, however, any of the second to the seventh embodiments may be applied in the same way. With reference to FIG. 7, liquid crystal display element 60 is disposed over the illumination apparatus according to any one of the aforementioned embodiments. Liquid crystal display element 60 is comprised of polarizers 60A and 64B laminated respectively on one outer surface of two transparent substrates 61A and 61B which are disposed in the upper and the lower portions thereof, and a liquid crystal layer 63 and a color filter 62, both of which are disposed between the two transparent substrates. Switching elements, such as TFTS, an orientation (alignment) film, and transparent electrodes are omitted from the drawing of FIG. 7. In this embodiment of the invention, nematic liquid crystal twisted at 90 degrees is used as liquid crystal 63, and polarizers 60A and 64B are arranged so as to be normally white by orthogonally disposing the respective polarization axes thereof However, its liquid crystal display modes are not limited.

Further, the polarization direction of emission light 120 from light guide device 10 and the polarization light transmittance axis of polarizer 64B are set to agree with each other. Further, because emission light 120 from the illumination apparatus is a highly collimated light, a liquid crystal display device having an enhanced frontal brightness can be realized. Still further, a spreader 70 may be provided as well in order to spread the collimated emission light. At this time, it is preferable for the spreader 70 to be able to maintain the polarization of light emitted from polarization converter 30.

Embodiment 9

Figure 8:
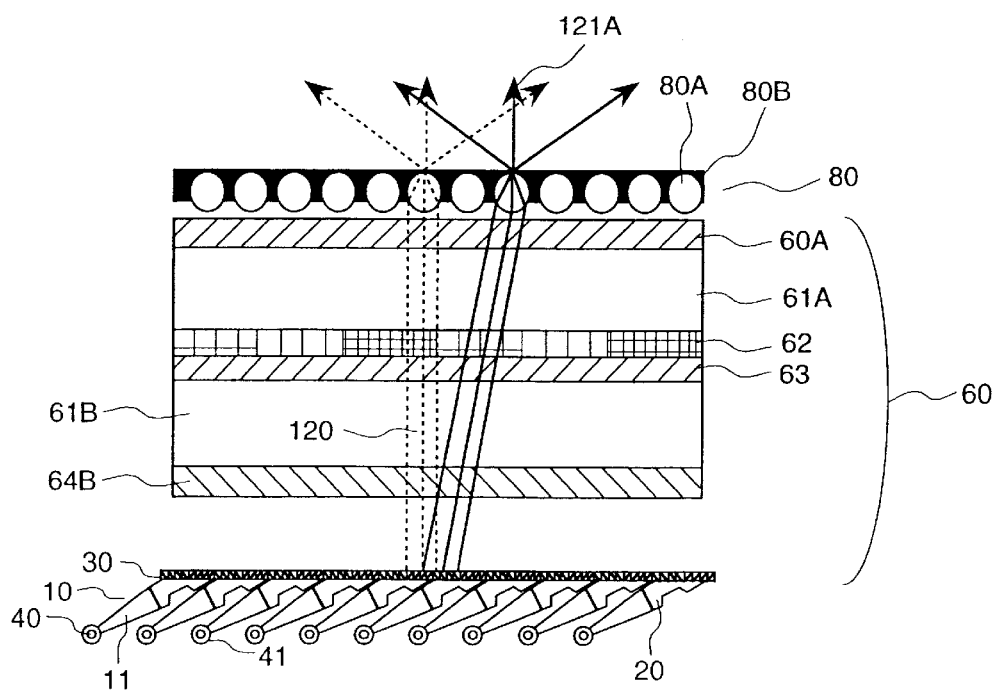
FIG. 8 is a cross-section of a liquid crystal display device according to another embodiment of the invention.

A ninth embodiment of the invention relates to a liquid crystal display device that employs the illumination apparatus according to the first to the seventh embodiments of the invention. The description of the ninth embodiment will be made by way of example with reference to the first embodiment, however, the second to the seventh embodiments are also applicable in the same manner. With reference to FIG. 8, a screen 80 is disposed on the liquid crystal display element 60 of the eighth embodiment of the invention. The structure of the ninth embodiment of the invention is almost the same as the eighth embodiment except for the provision of screen 80 and elimination of spreader 70.

Figure 9:
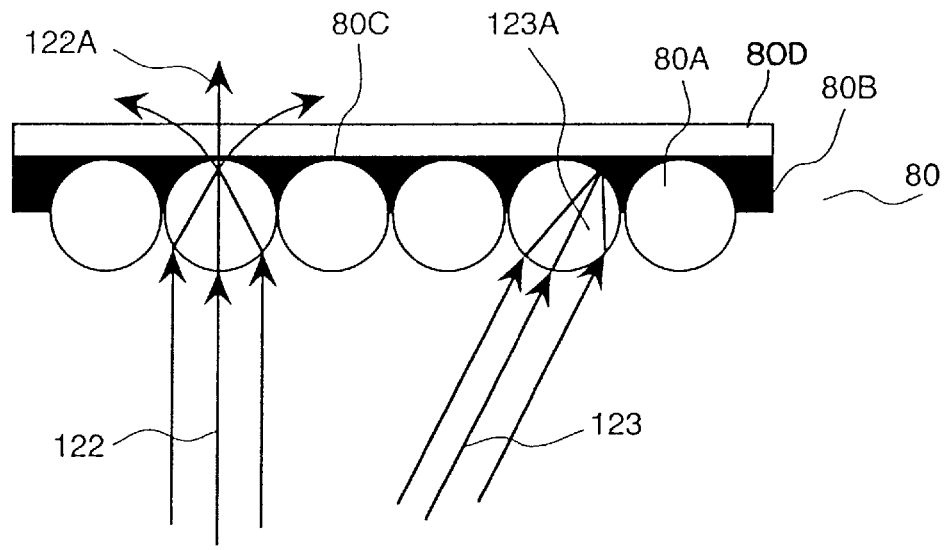
FIG. 9 is a diagram of the display screen in the liquid crystal display device of FIG. 8.
Figure 10:
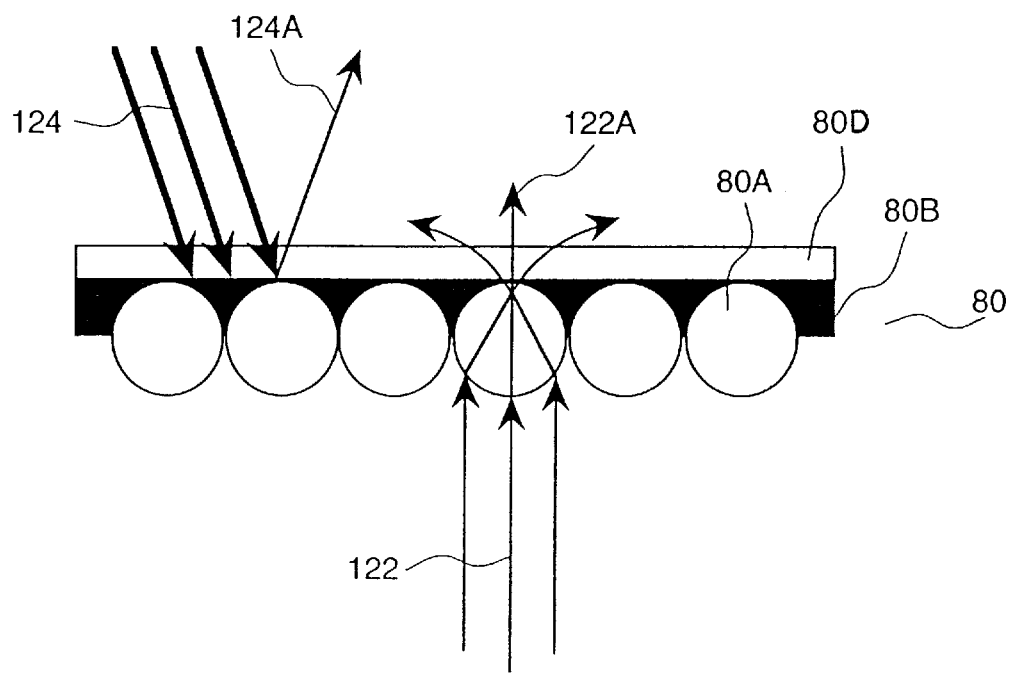
FIG. 10 is another diagram of the display screen in the liquid crystal display device of FIG. 8.
Figure 11:
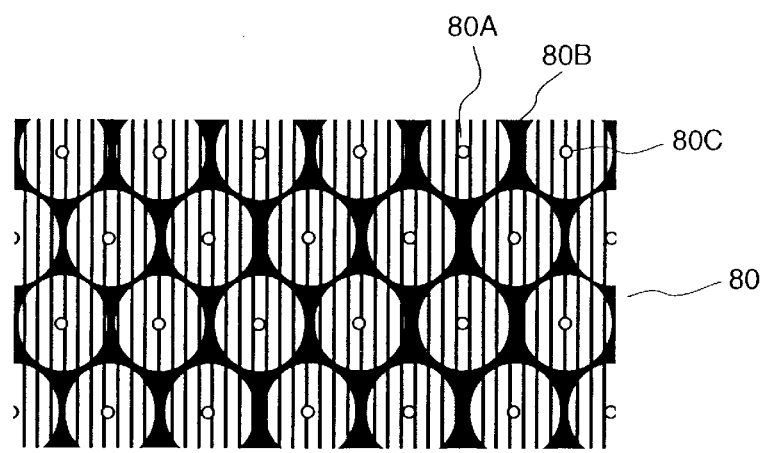
FIG. 11 is a diagram as viewed from above, of the display screen in the liquid crystal display of FIG. 8.

The screen 80 is shown in FIGS. 9–11 to explain the optical characteristics thereof. Screen 80 is comprised of spherical beads 80A having a refraction index of 1.7 and a black absorbent 80B. They are arranged in a close-packed structure, as seen from the emission side in FIG. 11, wherein, except for a very small opening 80C, the other regions are almost covered by the black absorbent 80B having a transparent medium 80D formed thereon. As indicated in FIG. 9, straight incidence rays of light 122 on screen 80 are condensed at opening 80C according to the angles of incidence thereof and the refraction indexes of the beads 80A, and then the rays are spread from the screen as emission light 122A through the layer 80D. On the other hand, inclined incidence rays of light 123 directed to screen 80 are absorbed by black absorbent 80B and are not emitted as shown by reference numeral 123A. Therefore, the inclined rays of light which deteriorate the resolution of the display can be absorbed. Further, although most displays are used in such environments as offices or the like in the presence of external light, however, the screen 80 according to the invention is, almost covered by absorbent 80B when viewed from the viewer's side as indicated in FIGS. 10, 11; therefore, external light 124 is almost totally absorbed except for a small amount of light 124A reflected on a small opening 80C in the screen. Therefore, even in such environments in which there is significant external light, the brightness of the black color in the display is increased, and its contrast ratio is not deteriorated according to the invention.

Although sphere beads are used for the screen according to this embodiment of the invention, the invention is not limited thereto, and a semi-spherical microlens array may be used as well. Still further, when it is desired to emit the light in a unidirection, a strip-formed rod lens array may be used. Advantageously, the absorbent of the invention is preferably disposed to absorb unnecessary rays of light.

As a result, the display device according to this embodiment of the invention will obtain a high resolution, a wide-viewing angle performance and high quality display with no reversal of gradation, and will provide the least dependency of color changes and contrast ratio changes on the viewing angle, to an extent never attained by the prior art liquid crystal display elements.

Embodiment 10

Figure 12:
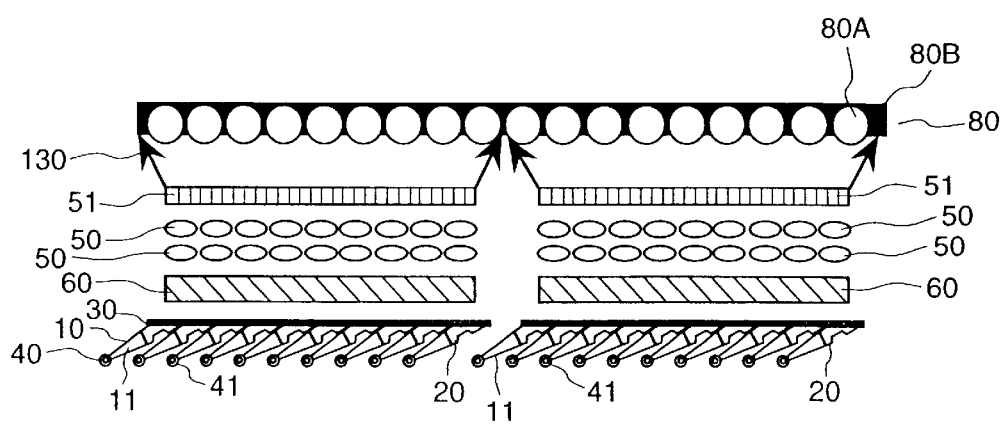
FIG. 12 is a cross-section of a liquid crystal display device according to one embodiment of the invention.

A tenth embodiment of the invention relates to a liquid crystal display device that uses an illumination apparatus according to the first to the seventh embodiments of the invention. This embodiment of the invention is directed to a large screen liquid crystal display system, as seen in FIG. 12, which comprises a plurality of liquid crystal display elements 60, a microlens array 50 serving as a focus system, a Fresnel lens 51 serving as a magnifying system, and a screen 80 for displaying an enlarged picture thereon, whereby a thin and seamless large display screen liquid crystal display system can be provided. A construction which can be applied to this embodiment of the invention for synthesizing a seamless picture by focusing and enlargement is disclosed, for example, in JP No. 2810572. In this embodiment of the invention, by application of the first to the ninth embodiments, a large screen liquid crystal display device featuring an increased light utilization efficiency and a wider viewing angle can be realized. The display device according to this embodiment of the invention will obtain a high resolution, provide a wide viewing angle performance totally without gradation reversals, and have a minimal dependency on the viewing angle regarding the changes in colors and contrast ratios, to an extent never obtained by the prior art.

Embodiment 11

Figure 18:
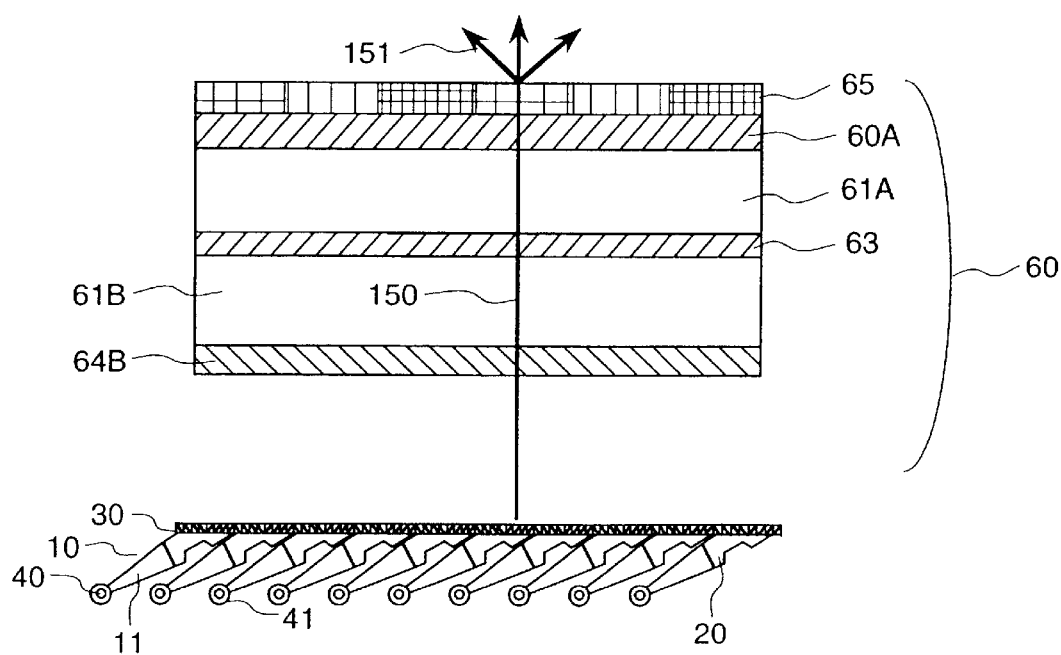
FIG. 18 is a cross-section of a liquid crystal display device according to still another embodiment of the invention.

This embodiment of the invention relates to a liquid crystal display device that employs the illumination apparatus of the invention typically from the first to the seventh embodiment. The following description of this embodiment will refer by way of example to the first embodiment, however, the second to the seventh embodiments may be applied in the same way. With reference to FIG. 18, the liquid crystal display element 60 is disposed over the illumination apparatus of any one of the aforementioned embodiments of the invention. The liquid crystal display element 60 is comprised of polarizers 60A and 64B secured on one external surface of two transparent substrates 61A and 61B disposed in the upper and the lower directions, and a liquid crystal layer 63 interposed between the two transparent substrates 61A and 61B. Further, as a light source 40, a cold cathode fluorescent lamp having a wavelength of 390 nm is used. A fluorescent material 65 is disposed for each pixel on its polarizer. In the description of FIG. 18, switching elements, such as TFTS, an alignment layer, and transparent electrodes are omitted. In this embodiment of the invention, a 90-degree-twisted nematic liquid crystal is used as liquid crystal 63. Polarizers 60A and 60B are arranged to produce a normally white color with the respective polarization axes thereof disposed orthogonally. However, its liquid crystal display modes are not restricted.

Further, the polarized direction of light 150 emitted from light guide 10 and the polarization transmittance axis of polarizer 64 B are arranged to agree with each other. Further, because the light 150 emitted from the illumination apparatus is highly collimated, a liquid crystal display device that features an enhanced frontal brightness can be obtained. Further, the collimated emission light is modulated in the liquid crystal element and is directed to enter into fluorescent material 65 provided on polarizer 60A. Upon incidence of near-ultraviolet rays or ultraviolet rays on the fluorescent material, the light corresponding to RGB is emitted therefrom thereby providing for a wide viewing angle display according to the invention. Further, because of the thickness of the transparent substrate 61A, the resolution may drop. Therefore, it is preferable to dispose BM (black matrix) between fluorescent materials 65. Still further, in order to utilize a backward fluorescence component of a total fluorescence of the fluorescent material for the purpose of display, it is preferable to dispose a reflector between fluorescent material 65 and polarizer 60A for reflecting emission light 151 and the backward component. Still more, it is preferable to dispose a film on fluorescent material 65 for absorbing external light and allowing the transmittance of excited fluorescence because the fluorescent material 65 scatters external light.

A wavelength of the light source to be used in this embodiment is not limited in particular, however, it is preferably more than 380 nm and smaller than 500 nm, in consideration of an emission efficiency of the fluorescent material and the transmittance factors of respective component members, such as the transparent substrate, polarizers, light guide and the like.

Embodiment 12

Figure 19:
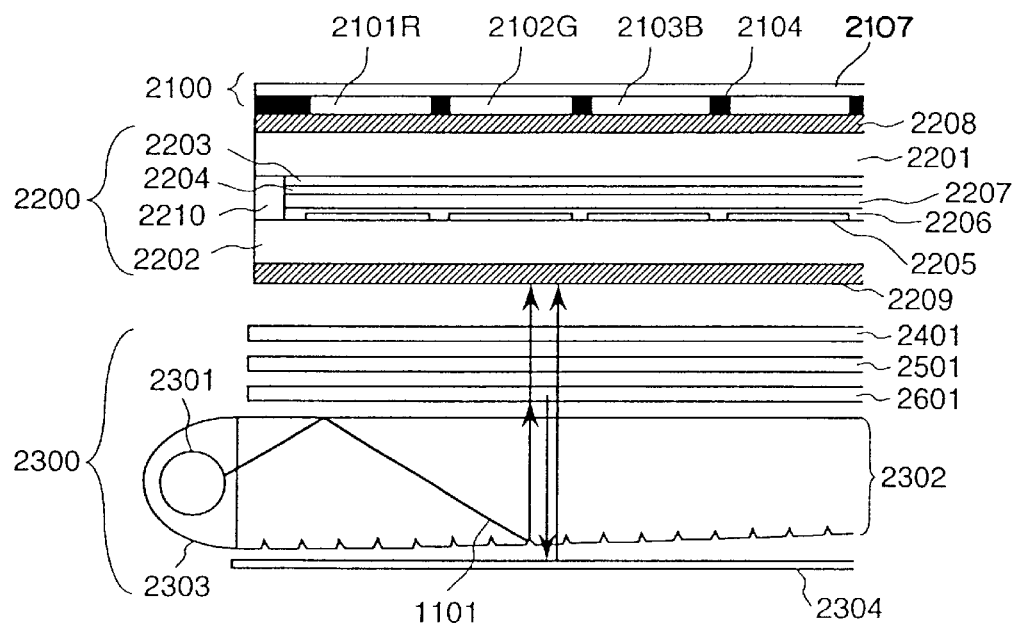
FIG. 19 is a schematic cross-section in part of a color display device according to one embodiment of the invention.

With reference to FIG. 19, a twelfth embodiment of the invention will be described. FIG. 19 is a schematic cross-sectional view of an example of a color display device according to this embodiment.

A liquid crystal display element 2200 displays a picture by modulation of a polarized state of the light incident on its liquid crystal layer. Most of the liquid crystal display elements can be classified roughly into two types, including of the active matrix addressed type using switching elements, such as TFTS, and the multiplex addressed type. However, as an example of a type of element that displays a picture by modulation of the polarized state of light incident on the liquid crystal layer, an active matrix-addressed type of TN liquid crystal display elements or a multiplex addressed type of STN liquid crystal display elements and the like may be considered. The following description will be made by way of example with reference to a TN liquid crystal display element.

Liquid crystal display element 2200 is comprised of: a first transparent glass substrate 2201 having a lamination of a transparent electrode 2203 and an alignment layer 2204; a transparent electrode 2205 which constitutes alignment layer 2206 and a pixel; a second transparent glass substrate 2202 having wiring, switching elements, such as thin film transistors which are not indicated in the drawing, but are to be connected with the transparent electrode 2205; and a liquid crystal layer 2207 made of nematic liquid crystal having a positive isotropic dielectric constant, which is filled in a gap formed by spacers (not shown) between the two transparent glass substrates 2201 and 2202 and via sealant 2210.

An alignment direction of major axes of the liquid crystal molecules of the liquid crystal layer 2207 is determined by orientation or alignment processing, such as rubbing or the like, on the alignment layer formed on the two transparent glass substrates 2201, 2202, and provides a twisted state of 90 degrees continuously between the transparent glass substrates.

On the backward surface (illumination incidence plane) of transparent glass substrate 2202 and on the frontal surface (light emission plane; viewer's side) of 10 transparent glass substrate 2201, there are disposed polarizers 2209 and 2208, respectively, so as to allow for mutually orthogonal, linearly polarized beams of light to pass therethrough. The directions of alignment of major axes of liquid crystal molecules on the transparent glass substrates 2201, 2202 are arranged both to be parallel or orthogonal relative to the axis of transmittance of linearly polarized light of polarizers 2208, 2209.

As polarizers 2208, 2209 according to the invention, a film of drawn polyvinyl alcohol to which iodide is absorbed in order to provide for a polarization function is prepared. On both surfaces of this film, a protective layer made of triacetile cellulose is coated, and this polarizer film is optically bonded on the transparent glass substrates 2201, 2202 using acrylic adhesives.

By provision of the aforementioned arrangement, a linearly polarized light incident from the backward surface (illumination incidence plane) of liquid crystal display element 2200 and which has passed through polarizer 2209 is allowed to reach polarizer 2208 via the liquid crystal layer 2207. At this instant, the state of polarization of light that passes through the liquid crystal layer 2207 can be varied by an electric field applied to the liquid crystal layer 2207. Therefore, a voltage corresponding to picture information is applied across transparent electrodes 2203 and 2205 on the two transparent glass substrates to apply an electric field selectively to the liquid crystal layer 2207 such that the state of polarization of light passing through the liquid crystal layer 2207 is changed to control the quantity of light passing through polarizer 2208, thereby forming a desired optical image.

Figure 27:
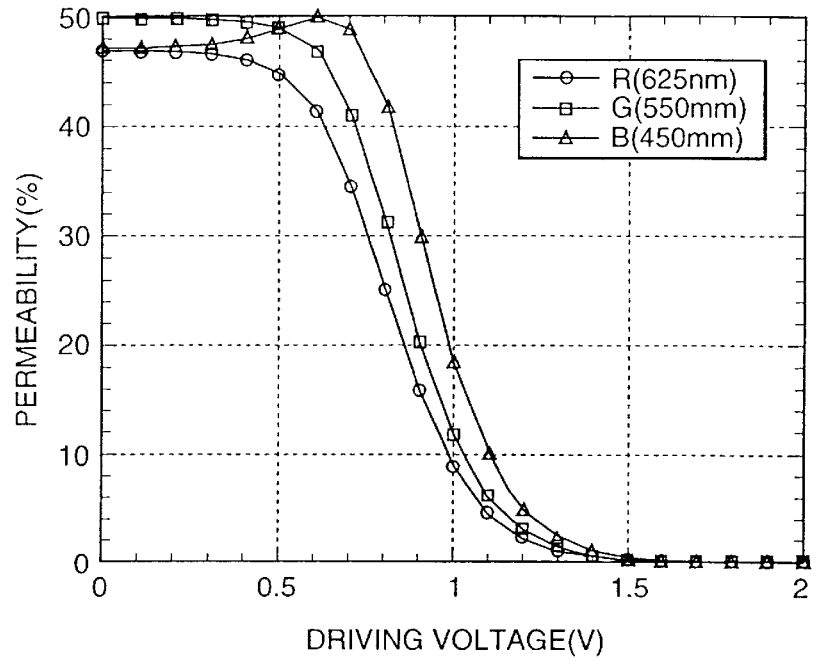
FIG. 27 is a graph indicating a relationship between liquid crystal drive voltages of the conventional color liquid crystal display device and light transmittance factors thereof.
Figure 28:
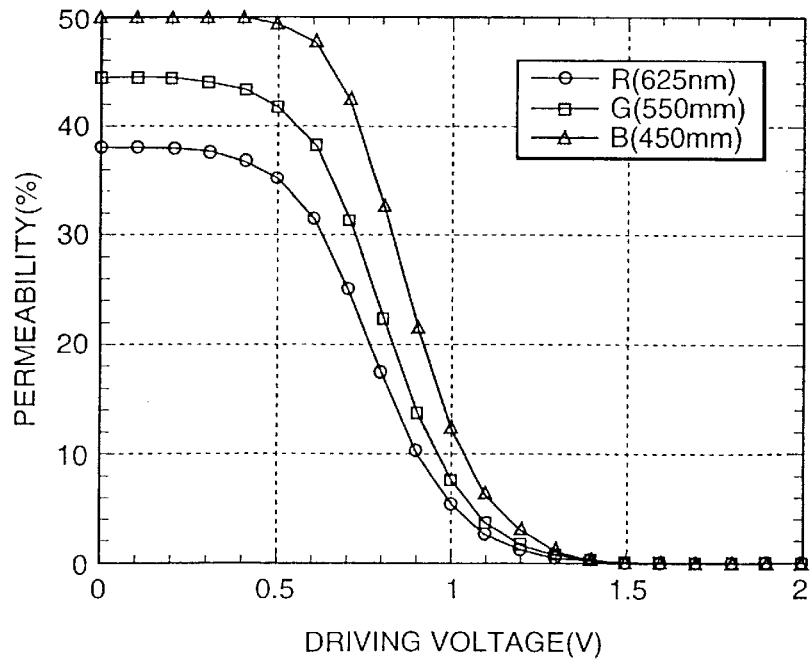
FIG. 28 is a graph indicating a relationship between the liquid crystal drive voltages of the liquid crystal display element and the light transmittance factors according to the embodiment of the invention.

With reference to FIG. 27, there is shown a conventional relationship between liquid crystal drive voltage and transmittance for a color TN liquid crystal display element using a conventional micro color filter. In a conventional color liquid crystal display element, the relationship between liquid crystal driver voltages and light transmittance varies according to each light of a different color, as indicated in FIG. 27; therefore, normally, using green light which has a high relative luminosity factor, the value of Δn·d of a liquid crystal display element is designed such that a maximum efficiency will be obtained for green. Here, Δn is birefringence, and d is a gap in the liquid crystal layer. In this case, in a condition at which the maximum brightness for green is obtained, maximum brightness for blue and red colors is not obtained.

In the color display device of the invention, because it is only the blue color that is modulated in the liquid crystal display element 2200, it is necessary for the liquid crystal display element 2200 to be conditioned to be able to obtain a maximum brightness with respect to blue.

More specifically, in the conventional color liquid crystal display element illustrated in FIG. 27, Δn·n=0.4452 (wavelength: 633 nm). However, according to the invention, the value of Δn·n is reduced from the value used in the prior art, for example, to be Δn·n=0.3528 (wavelength; 633 nm), whereby the relationship between the liquid crystal drive voltage and the light transmittance in the liquid crystal display element according to this embodiment of the invention can be optimized for the color blue.

A wavelength converter 2100 is comprised of a fluorescent film containing a fluorescent pigment, fluorescent cosmetics or fluorescent dyes which absorb short wavelength visible light (blue light) and emit long wavelength visible light (green and red), which fluorescent film is coated or a transparent glass plate or resin plate 2107 and is processed to have a patterning corresponding to the pixels of the liquid crystal element 2200.

In a portion thereof corresponding to a red color display pixel of the liquid crystal display element 2200, a red color fluorescent material 2101R is patterned which absorbs blue light and emits a red color fluorescence. In a portion thereof corresponding to a green color display pixel of the liquid crystal display element, a green color fluorescent material 2102G is patterned which absorbs blue light and emits a green color fluorescence. In a portion of which corresponding to a blue color display pixel of liquid crystal display element 2200, a blue color filter is patterned, which cuts off wavelengths other than those for the blue color. In this case, because fluorescence from a fluorescent pigment becomes a diffusion light, a black matrix 2104 may be disposed between different fluorescent materials corresponding to different pixels or between color filters in order to prevent stray light from reaching another portion not intended to be excited.

As materials that can emit fluorescence light in response to irradiation of a low energy light, such as visible light, there may be used organic fluorescent pigments, such as laser pigments, or fluorescent cosmetics.

Furthermore, in order to increase the purity of the respective colors of fluorescent light, a red color pigment is mixed with red color fluorescent material 2101R, and a green color pigment is mixed with green color fluorescent material 2102G. Alternatively, a red color filter, which absorbs wavelengths of light other than red color, may be formed on the surface facing the viewer of red color fluorescent material 2101R, and a green color filter, which absorbs wavelengths of light other than green color, may be formed on the surface facing the viewer of green color fluorescent material 2101R.

As materials for the transparent substrates according to the invention, a glass plate, resin or resin film transparent to visible light may be used. As such transparent resin materials, polycarbonate, polysulfone, polyvinyl alcohol, polyethylene terephtalate, polyacrylate, polymethylmethacrylate or the like may be used.

Coating of fluorescent films containing fluorescent pigments and their patterning can be done using known techniques. For example, printing methods using ink blended with fluorescent materials in its ink base, spin coating methods for spin coating liquid resist containing fluorescent materials, and photolithography for patterning on the coating thus formed maybe used.

Further, as a wavelength converter suitable for this embodiment, a fluorescent converter filter as disclosed in JPA No. 9-245511 may be employed.

With reference to FIG. 19, the illumination apparatus 2300 is comprised of light guide 2302; a light source 2301 which is disposed on one side and along a depth direction of the light guide 2302 and has a length for emission of light corresponding to the depth of the one side of the light guide; a lamp cover 2303 disposed to partly cover light source 2301; a cholesteric liquid crystal layer 2601 disposed in a lamination, via an air gap, of a polarization splitter on an external surface of light guide 2302 (facing liquid crystal display element 2200), a retardation film 2501 as a polarization converter, and a microprism array 2401 as an optical path converter; and a polarization retaining reflector 2304 disposed on the back surface of the light guide 2302 via air gap (opposite to the liquid crystal display element 2200).

The color display device according to this embodiment of the invention, that effectuates its color display by fluorescence of the fluorescent material pattern-formed on wavelength converter 2100, features the use of a blue color light, not ultraviolet rays or near ultraviolet rays, in he provision of a light source (as excitation rays of light).

The reason for use of blue light is because ultraviolet light tends to be absorbed in the light guide or in the liquid crystal display element, thereby preventing an efficient utilization of the light from the light source; and, in addition, the liquid crystal materials, alignment films and the like tend to be deteriorated by irradiation of ultraviolet rays, thereby shortening their service life.

Figure 29:
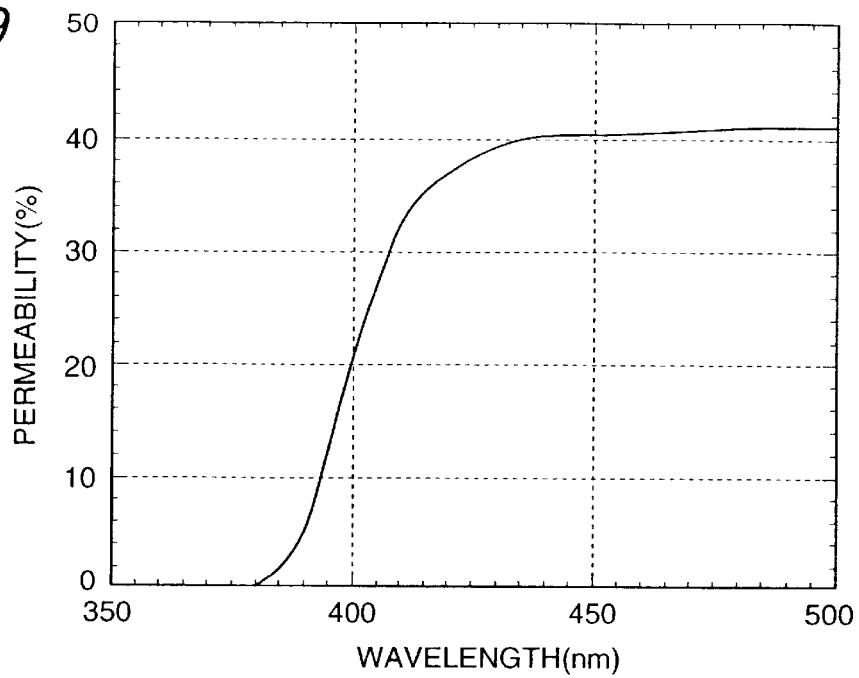
FIG. 29 is a graph indicating an example of transmittance spectra of the polarizer to be used in the liquid crystal display element according to the invention.

With reference to FIG. 29, an example of the transmittance spectra of the polarizers used for the liquid crystal display element of the invention is illustrated.

Normally, in the polarizer used for the liquid crystal display element, a ultraviolet absorbent is added to a protection coating of the polarization film in order to protect the polarization film from the effects of ultraviolet light. Therefore, ultraviolet rays having a wavelength smaller than 380 nm are almost completely absorbed (refer to FIG. 29).

Figure 30:
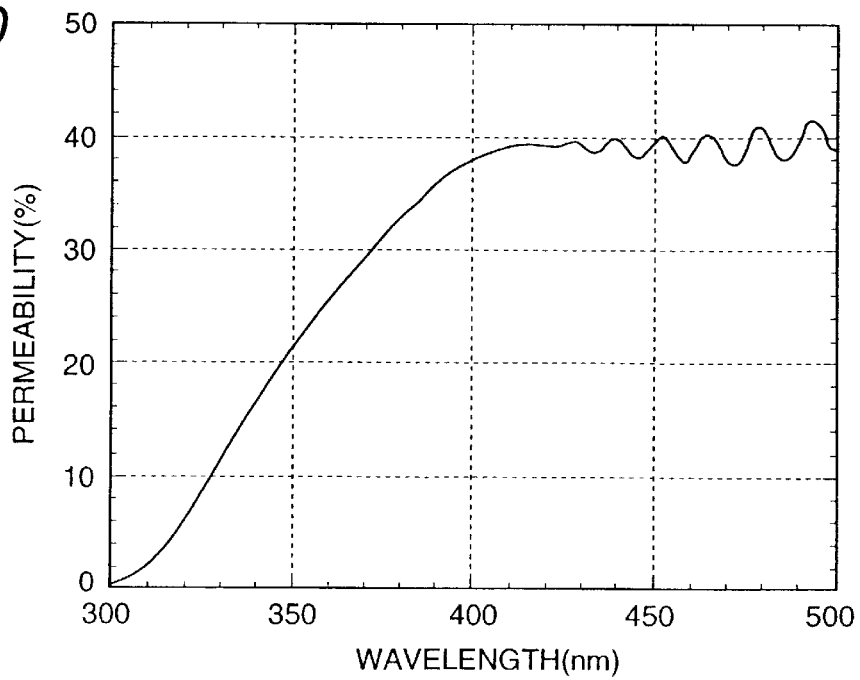
FIG. 30 is a graph indicating an example of transmittance spectra of the liquid crystal display element of the invention excluding the polarizer.

Now, FIG. 30 shows a diagram of the transmittance spectra of the liquid crystal display element of the invention in which the polarizers are excluded. As clearly indicated, most portions of the ultraviolet rays are also absorbed in the transparent electrodes, alignment films and liquid crystal, and the transmittance drops rapidly if its wavelength becomes smaller than 400 nm.

Therefore, it is preferable for the peak wavelength of emission of the light source to be greater than 400 nm, and further, in order to be able to utilize the emission of the light source itself as blue color emission, it is preferably for the peak wavelength to be smaller than 500 nm so as to enhance the light utilization efficiency. Namely, light source 2301 is preferably a light source that satisfies such conditions in that it emits a blue light having a peak wavelength of emission at 400–500 nm, and is compact, has a high emission efficiency and a low exothermic property. More preferably, in consideration of the fact that the transmittance of the polarizers drops rapidly when its wavelength becomes smaller than 430 nm (refer to FIG. 29), and in consideration of the color purity of the light from the light source, the peak wavelength of emission of the light source is 430–480 nm.

As such a light source, a cold cathode fluorescent lamp, hot cathode fluorescent lamp, or light emitting diodes (LED) may be used. At first, by way of example, with reference to a cylindrical fluorescent lamp, the invention will be described in the following.

As fluorescent materials suitable for use in a fluorescent lamp, there are, for example, halophosphate phosphors such as Sr10(PO4)6C1:Eu2+,(Sr,Ca)10(PO4)6C1:Eu2+,(Sr,Ca) 10(PO4)6C1·nB2O3:Eu2+, phosphate phosphors such as Sr2P2O7:Eu 2+1 silicate phosphors such as (Sr,Ba)Al2Si2O8:Eu2+, Ba:2MgSi2O8:Eu2+, tungstate phosphors such as CaWO4, and aluminate phosphors such as BaMg2Al16O27:Eu2+, SrMg2Al10O17:Eu2+.

These fluorescent materials are used singularly or mixed with other fluorescent materials in the groups cited above as required in order to enhance the emission efficiency. By use of fluorescent lamps using these fluorescent materials, a high lamp emission efficiency at several tens 1m/W of a narrow band blue light with its half value width at less than 50 nm in the emission wavelength band can be obtained.

Lamp cover 2303 for covering light source 2301 and for reflecting light emitted from the light source toward light guide 2302 is formed into a cylindrical or elliptical shape so as to surround the light source, and is made of a reflector or reflecting film.

Light guide 2302 is comprised of a transparent acrylic resin, has a structure to confine the incidence light which enters from one end thereof by total reflection, and is provided with an inclined reflector including small inclined reflecting planes, such as plural irregularities or corrugated planes on its backward surface (opposite side to the liquid crystal element) for changing the angles of reflection of propagating rays therein to collimate or render them parallel at least in one direction and emit the collimated rays of light toward liquid crystal display element 2200.

Figure 20:
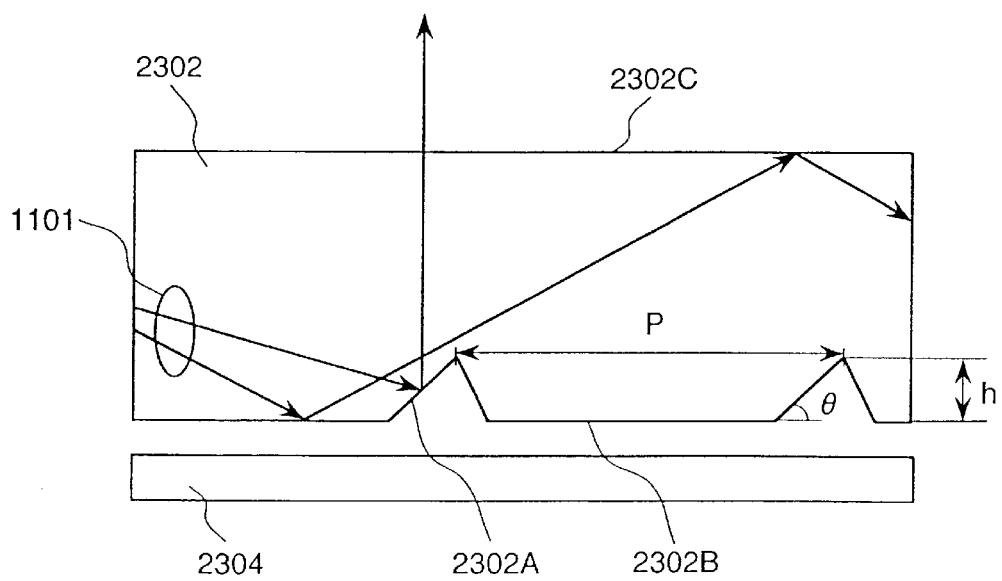
FIG. 20 is a cross-section in part of a light guide according to one embodiment of the invention.

FIG. 20 is a schematic diagram in cross-section of an example of light guide 2302 according to the invention. Light guide 2302 as seen in FIG. 20 is comprised of a flat surface 2302C facing the liquid crystal element; a back surface including an almost flat main back surface and a plurality of triangle projections rising upward; and an inclined reflecting plane 2302A formed on one side of the plurality of triangle projections.

The back-side main flat surface 2302B in light guide 2302 is arranged such that light which enters into the light guide is propagated therein by a total reflection between the top surface 2302C and the bottom surface 2302B and is confined therein. Further, inclined reflecting plane 2302A provided on the back surface in light guide 2302 serves to change the angle of reflection of a part of the rays of light propagating within the light guide and to emit them from the top surface 2302C of the light guide. Therefore, the inclined reflecting plane 2302A preferably had a mirror-finished reflection surface coated by a metal film, such as Al, Ag, etc., or a dielectric multi-layered film.

Here, in order to be able to match the diagonal size of 13.3 inches of the liquid crystal display element 2200, a cylindrical fluorescent lamp having a diameter of 2.5 mm and a length of 290 mm is used the light source 2301. Light guide 2302 is made from acrylic resin having an index of refraction of 1.49, a maximum thickness of 4 mm, and a size of 290 mm×224 mm. Further, the inclined reflecting plane 2302A is aligned with its longitudinal axial direction, parallel with the longitudinal direction of light source 2301. And, it is set such that an average pitch P between the peaks of inclined reflecting planes 2302A os P=200 μm, an average height h is h=10 μm, and an average angle of inclination θ is θ=40 degrees.

Further, in order to increase and maintain uniformity of emission from light guide 2302, it may be arranged that the height h of the inclined reflecting planes 2302A is changed to be lower in the vicinity of light source 2301 and is increased gradually as its position moves farther from the light source, or that pitch P between inclined reflecting planes 2302A or the angle of inclination θ is changed gradually according to the distance from the light source, or that the thickness of the light guide 2302, i.e., between the top surface 2302C and the bottom main surface 2302B, is changed to become thinner according to the distance from the light source.

According to this structure of the invention, the light 1101 emitted from light source 2301 and which enter into the light guide 2302 is caused to propagate therein by repeating a total reflection between the upper surface 2302C and the bottom main surface 2302B thereof; however, a part of the rays propagating therein and arriving at the inclined reflecting planes 2302A have their angle of reflection changed out of the total reflection and are caused to be emitted from the light guide.

Rays emitted from light guide 2302 are allowed to spread in a direction parallel to the longitudinal direction (along the peak line) of a triangular groove which constitutes an inclined reflecting plane 2302A; however, in a direction perpendicular to the longitudinal direction of the triangle, the rays are substantially collimated within ±10 degrees or less in terms of half value angles.

Figure 21:
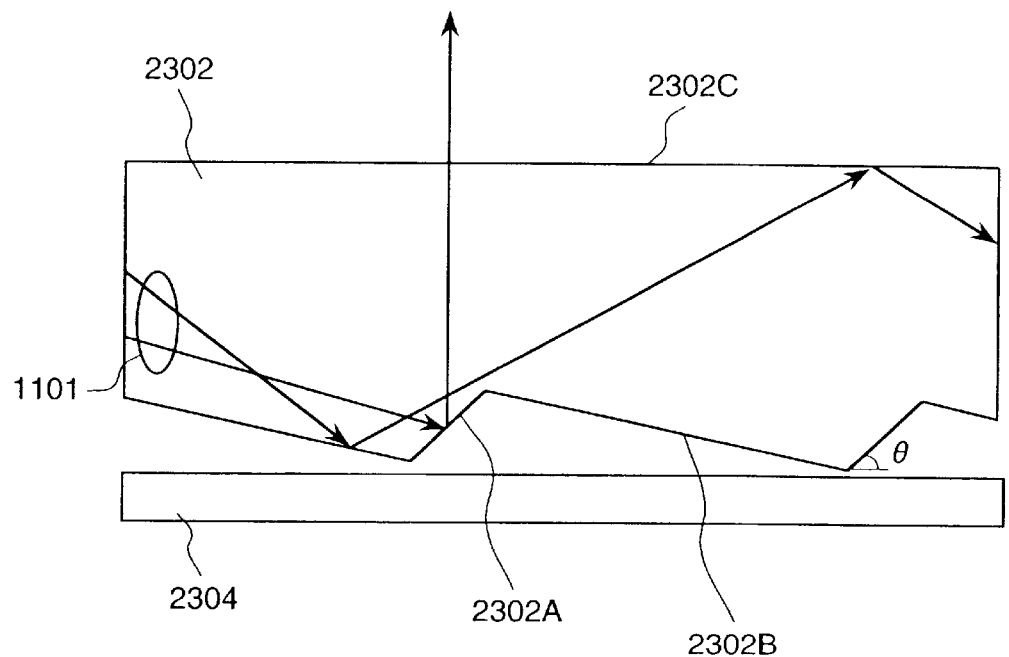
FIG. 21 is a cross-section in part of a light guide according to another embodiment of the invention.
Figure 22:
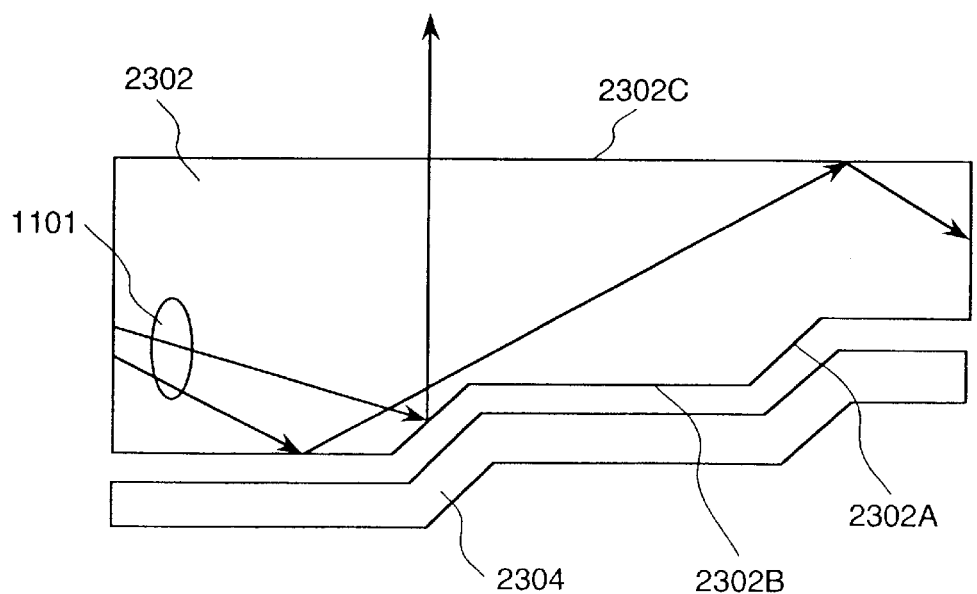
FIG. 22 is a cross-section in part of a light guide according to still-another embodiment of the invention.

By way of example, the shape of light guide 2302 is not limited to the aforementioned type, and patterns formed into continuous waves or corrugation such as illustrated in FIGS. 21 or 22 may also be adopted.

Cholesteric liquid crystal layer 2601 is a polarization splitter and functions to split rays coming from light source 2301 and advancing toward liquid crystal display element 2200 via light guide 2302 into two different types of polarized rays, and which may be comprised of a liquid crystal cell which is formed by filling low molecular cholesteric liquid crystal into a gap between two sheets of glass substrates subjected to alignment processing, or may be comprised of a high polymer molecule cholesteric liquid crystal layer formed on an optically aligned glass or transparent resin.

Cholesteric liquid crystal layer 2601 has a unique optical property based on the helical alignment of its molecules, wherein for light coming in parallel to its helical axis, a circular light of polarization of which, in one direction of rotation in accordance with a direction of rotation of its cholesteric helical, is reflected, and the other circular light of which is allowed to pass through, namely, it demonstrates a selective reflection. Therefore, it is preferable for the helical axis of cholesteric liquid crystal film 2601 to be arranged approximately vertical to the plane of the liquid crystal display element 2200 such that the main flux of light incident on cholesteric liquid crystal film 2601 becomes parallel to the helical axis.

Further, the center wavelength $\lambda_0$ of selective reflection by the cholesteric liquid crystal film is expressed by $\lambda_0=n_m \cdot p$, and its wavelength band $\lambda\Delta$ is expressed by $\Delta\lambda=\Delta n \cdot p$, where p is the helical pitch of the cholesteric liquid crystal film, $n_m$ is an average index of refraction, and $\Delta n$ is a birefringence of the liquid crystal, wherein, if the indexes of refraction which are parallel and vertical to a major axis of the liquid crystal are assumed to be $n_e$ and $n_0$, respectively, they are expressed by the following equations.

$$n_e \text{ and}=[(n_e^2+n_0^2)/2],$$

$$\Delta n=n_3-n_0.$$

Preferably, a peak wavelength of emission of the light source and the center wavelengths $\lambda_0$ of the selective reflection are made to coincide with each other. Generally, $n_m$ has a value from 1.5 to 1.7, and $\Delta n$ has a value from 0.10 to 0.26; therefore, its helical pitch is automatically determined from the peak wavelength of emission of the light source and a physical value of the liquid crystal material. For example, for a fluorescent lamp which uses BaMg2A116O27:Eu2+ as a main fluorescent material of the light source, a half value width of its emission spectrum is approximately 50 nm, and its peak wavelength of emission becomes approximately 450 nm; therefore, if a liquid crystal having $n_m$=1.5 and $\Delta n$=0.26 is used, its helical pitch may be set approximately at 300 nm. In this case, a spectrum band of its selective reflection is 76 nm or so, which can cover most of the emission spectra of the light source, and, therefore, the polarization splitting of the light source can be executed very efficiently.

Figure 23:
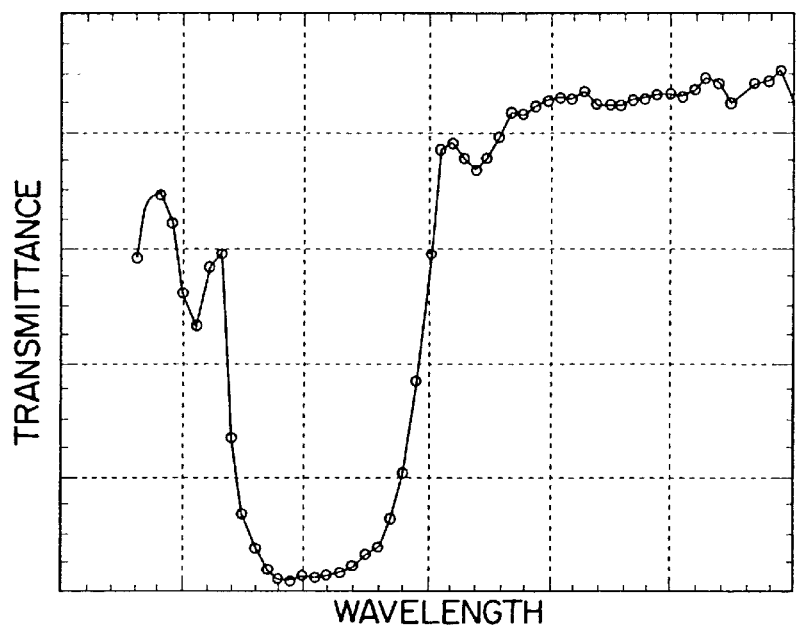
FIG. 23 is a graph indicating an example of transmittance spectra of circularly polarized light in a cholesteric liquid crystal layer according to an embodiment of the invention.

FIG. 23 is a graph which shows an example of the dependency of transmittance on the wavelengths for a specific circular polarization light in cholesteric liquid crystal film 2601.

As described hereinabove, because light emitted from the light source 2301 is a monochrome blue light, and if a fluorescent lamp is used, its spectrum band of emission can be narrowed as narrow as 50 nm or less in terms of the half value width. Therefore, non-polarized rays emitted from the light source can be split into different circularly polarized rays of light by one layer of the cholesteric liquid crystal film. Namely, because there is no need to use a lamination of a plurality of cholesteric liquid crystal films having a different pitch, or cholesteric liquid crystal layers having pitches which continuously vary as disclosed in Asia Display 95 Digest p 735, a high performance and a low cost polarization splitter can be realized according to the invention.

Phase retardation film 2501 is a polarization converter which functions to convert the circularly polarized light which has passed through the cholesteric liquid crystal film 2601 into a linear polarization light having an axis of transmittance identical with the axis of transmittance of the polarizer 2209, or an oscillation direction of an electric vector thereof, the polarizer 2209 is disposed on the bottom surface of liquid crystal display element 2200 (toward the illumination side) and allows for linearly polarized light to pass therethrough. Therefore, the phase retardation film 2501 to be selected for use is one that can function as a quarter wavelength plate in the emission spectrum band of the light source.

As such a retardation film 2501, a high polymer film drawn uniaxially having a high transmittance to the light of the light source, such as polyvinyl alcohol, polycarbonate, polysulfone, polystyrene or the like, can be used. Further, mica, crystal or a liquid crystal film having its molecular axis aligned unidirectionally may be used as well.

By and large, transparent materials for constituting the retardation film, because their refraction index has a dependency on wavelength (have wavelength dispersion) a sufficient performance cannot be obtained by one layer of one species of a retardation film with respect to a broad spectrum band of emission, such as a white light. Therefore, two different types of retardation films having a different wavelength dispersion and laminated with their optical axes shifted from each other may be used. In this case, however, there arises a problem in that the performance is deteriorated due to a large change in phase retardation depending on the angle of incidence of light, not to mention an increased cost of manufacture.

However, according to the color display device of the invention, because the wavelength band of the light emitted from light source 2301 is ensured to become narrow at 50 nm or less in terms of its half value widths, a phase retardation film of one layer consisting of one species can satisfy required function sufficiently, thereby easily realizing a high performance polarization converter.

Microprism array 2401 is an optical path converter and functions to enhance collimation of illumination light emitted from light guide 2302 and advancing toward liquid crystal display element 2200. As this microprism array, a transparent sheet as disclosed in JP No. 1-37801 (Illumination panel), both surfaces of which have a flat surface and a corrugated surface, may be used.

Figure 24:
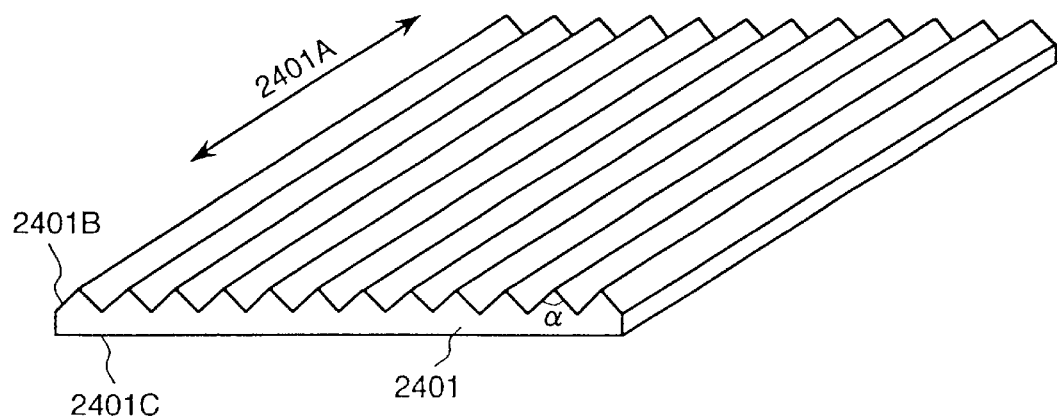
FIG. 24 is a perspective view of a schematic construction of a micro-prism array according to one embodiment of the invention.

With reference to FIG. 24, a microprism array 2401 is shown, which is formed of a transparent sheet comprised of an upper surface 2401B which is a corrugated to have triangle column prisms having an apex angle of $\alpha$, and a flat bottom surface 2401C, and which serves as an optical path converter and functions to collimate a flux of rays which spread in a perpendicular direction relative to a longitudinal direction of the prism, or along a peak line 2401A in a vertical direction relative to the plane of the flat surface 2401C.

The pitch between respective prisms is set at several tens $\mu$m, and the apex angle $\alpha$ is set at 80 to 100 degrees in order to fulfil its function. However, if the pitch of the respective prisms is the same as the pitch of the respective pixels of the liquid crystal display element, moiré becomes noticeable; therefore, it is preferable for the pitch of the prism to be set substantially smaller or larger than the pitch of the pixels, so that moiré will not be noticeable. Still more, as for the apex angle $\alpha$, it is preferable for this angle to be optimized according to a distribution of angles of emission from light guide 2302.

Light of emission from light guide 2302 according to this embodiment of the invention is substantially collimated in a perpendicular direction orthogonal to the longitudinal (peak line) direction of the inclined reflecting planes 2302A, but spreads in a direction parallel to the longitudinal direction (peak line) of the inclined reflecting planes 2302A. Therefore, the microprism array 2401 is disposed such that the longitudinal direction 2401A of the prism becomes orthogonal to the longitudinal (peak line) direction of the inclined reflecting planes 2302A of the light guide 2302 so that collimation of the illumination light incident on the liquid crystal display element 2200 is increased in omnidirections.

Further, the illumination light emitted from light guide 2302 and which passes through cholesteric liquid crystal film 2601 and retardation film 2501 is a linearly polarized light having the same oscillation direction of electric vectors as the axis of transmission of polarizer 2209 of liquid crystal display element 2200; and, therefore, if it is irradiated on liquid crystal display element 2200 as it is, there occurs almost no loss in polarizer 2209.

Therefore, in order to utilize the illumination light most efficiently, it is necessary for the microprism array 2401 to be able retain a state of polarization for the illumination light passing therethrough. Thereby, a transparent material suitable for use for the microprism array 2401 is preferably a material without optical refraction, or a transparent material with uniaxial optical anisotropy having its optical axis parallel or orthogonal to the longitudinal direction 2401A of the microprism. Still further, the longitudinal direction 2401A of the microprism is preferably arranged to become parallel or orthogonal to the oscillation direction of electric vectors of the linearly polarized light passing through the microprism array.

As a preferable transparent material to be used for microprism array 2401, there are a polycarbonate film formed by casting, a polymer film such as triacetyl cellulose, or an optically aligned transparent material such as alicyclic acryl resin formed by injection molding (Optres manufactured by Iitachi Kasei KK), or polymer films such as uniaxially drawn polycarbonate film, polyvinyl alcohol, polysulfone.

Polarization retaining reflector 2304 is provided by forming a reflecting surface that retains a state of polarization on a substrate such as a glass plate, resin plate resin film or the like, and has a function to reflect a light coming back from cholesteric liquid crystal film 2601 as reflected thereon and again to direct the reflected light toward liquid crystal display element 2200 while retaining its state of polarization.

The reflecting surface that can retain the state of polarization referred to here is a reflector that can reflect at least circularly polarized light in a vertical incidence light as circularly polarized light having a reversed direction of rotation. More specifically, a mirror-finished reflecting plane provided by depositing a metal film such as Al, Ag on a substrate, or a dielectric lamination film having a high reflection to the wavelengths of the light source may be used.

Figure 25:
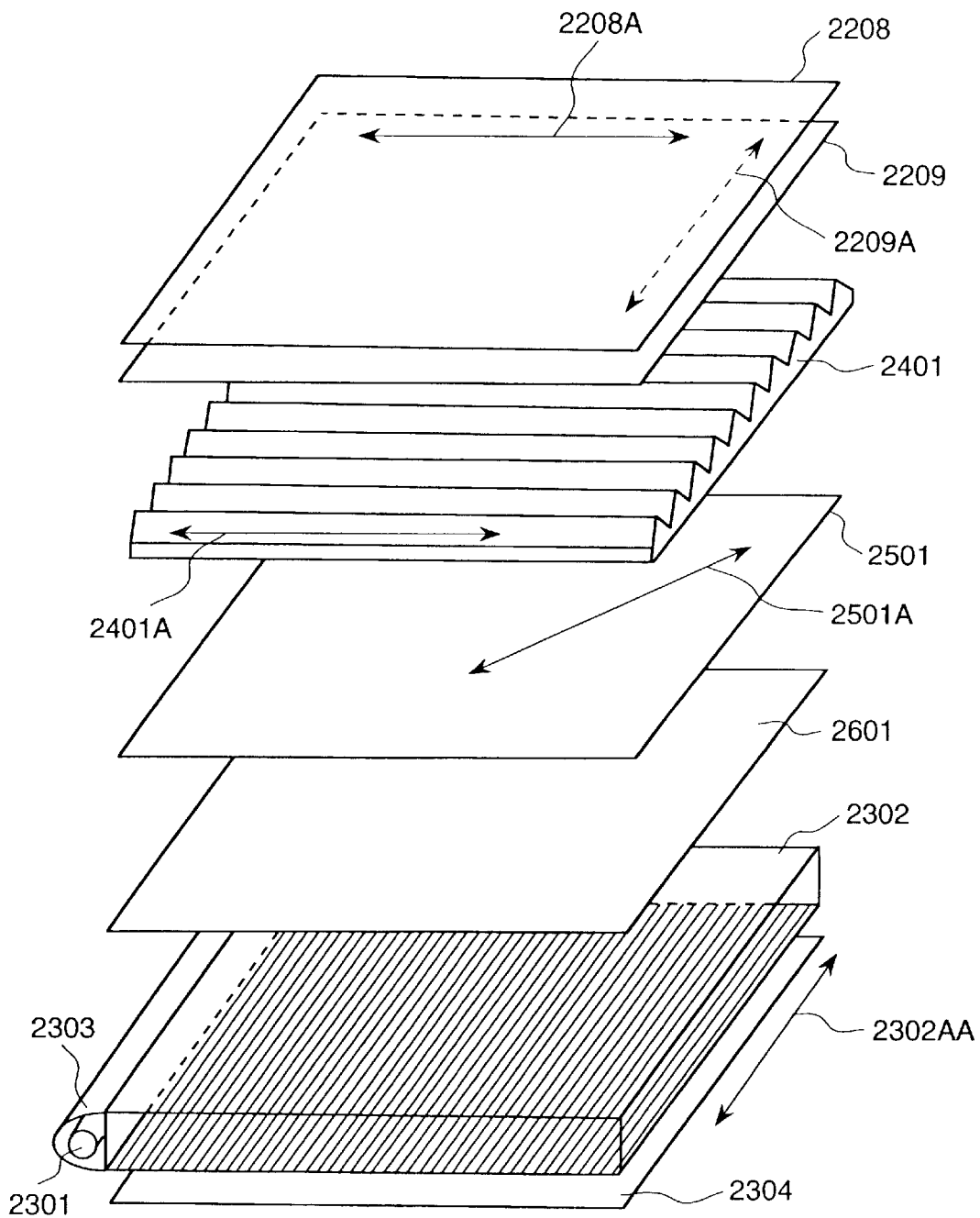
FIG. 25 is an exploded perspective view of a color display device according to one embodiment of the invention.

FIG. 25 is an exploded perspective view of an example of arrangements of respective components of a color display device according to the invention.

As described hereinabove, microprism array 2401 is arranged relative to the inclined reflector 2304 of light guide 2302 such that the longitudinal direction 2401A of the prism becomes orthogonal to the longitudinal (peak line) direction 2302AA of the inclined reflector 2302 provided on the bottom surface of light guide 2302. Still further, the axis of transmittance 2209A of polarizer 2209 provided in the bottom of the liquid crystal display element (illuminating side) is arranged perpendicular (or parallel) to the longitudinal (peak line) direction 2401 A of the microprism array 2401. Then, the axis of transmittance 2208A of another polarizer 2208 disposed on the surface of the liquid crystal display element (near to the viewer) is arranged orthogonal to the axis of transmittance 2209A of polarizer 2209.

Further, optical axis 2501A of retardation film 2501 is disposed diagonally at an angle of 45 (or 135) degrees relative to the axis of transmittance 2209A of polarizer 2209 in order for circularly polarized light which has passed through the cholesteric liquid crystal film 2601 is converted into linearly polarized light having an axis of polarization parallel to the axis of transmittance 2209A of the polarizer 2209.

Figure 26:
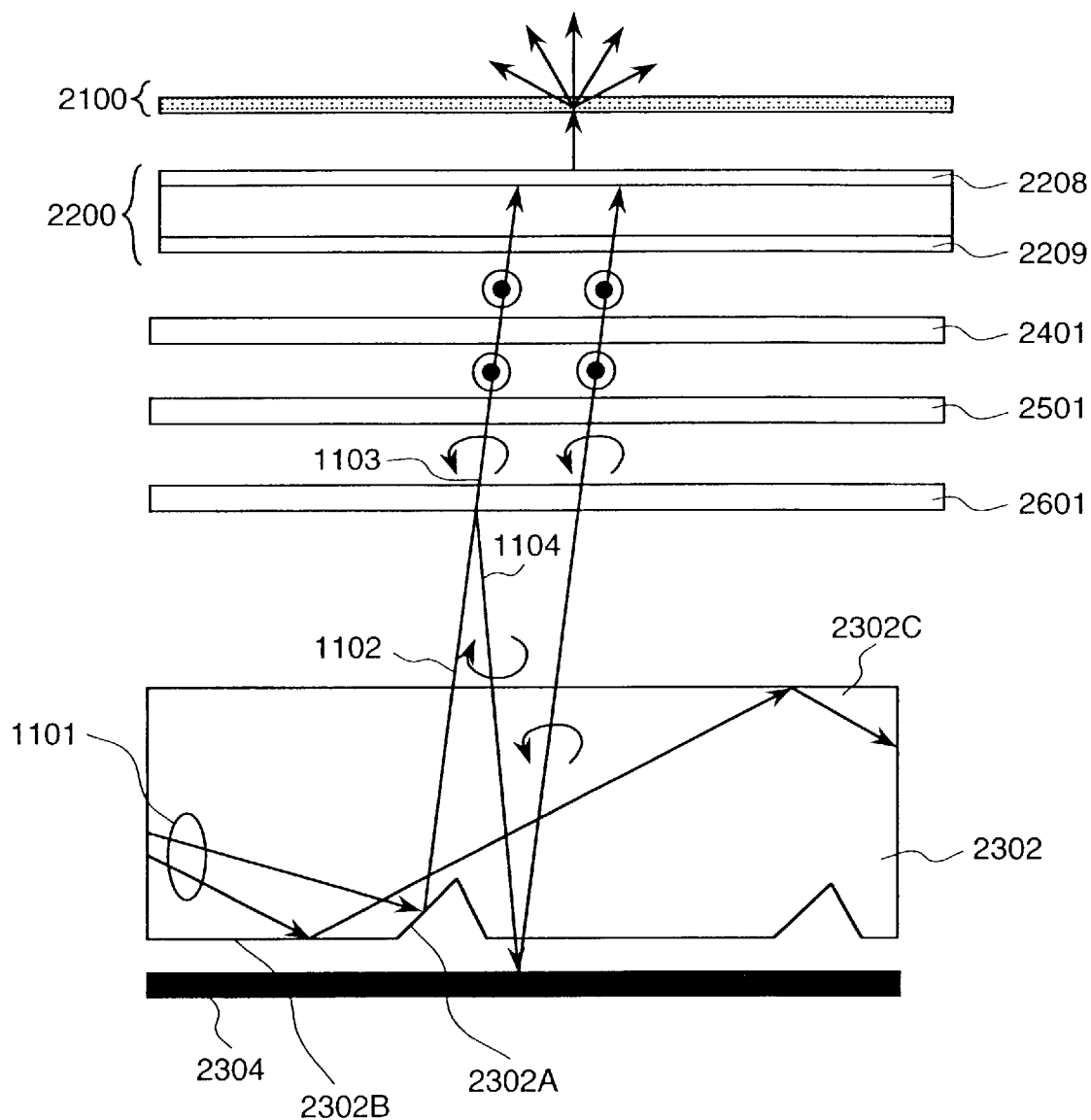
FIG. 26 is a schematic cross-section in part of a color display device according to the invention for indicating the operation thereof.

Now, the operation of this color display device will be described with reference to FIGS. 19 and 26. FIG. 26 is a schematic cross-section in part of the color display device of the present invention.

Light emitted from light source 2301 of FIG. 19 enters light guide 2302 directly or after having been reflected by lamp cover 2303. The light 1101 in light guide 2302 propagates by repeating total reflection between the upper surface 2302C and the bottom main surface 2302B inside the light guide 2302. A part of the light 1101 propagating in the light guide which reaches inclined reflector 2302A changes its direction to avoid the total reflection condition at the upper surface 2302C and is emitted therefrom toward liquid crystal display element 2200.

Light 1102 emitted from light guide 2302 of FIG. 26 reaches the cholesteric liquid crystal film 2601. In the following description, cholesteric liquid crystal film 2601 will be considered by way of example as allowing left-handed circularly polarized light (hereinafter referred to as left circular polarized light) to pass, and as reflecting right-handed circularly polarized light (hereinafter referred to as right circular polarized light).

As indicated in FIG. 26, light emitted from light guide 2302 is non-polarized light, of which a left circularly polarized component passes through cholesteric liquid crystal film 2601 and a right circularly polarized component is reflected by the same. Light 1103 which has passed through cholesteric liquid crystal film 2601 is converted by retardation film 2501 into linearly polarized light, the direction of oscillation of the electric vector of which is set to be identical with the axis of transmittance of the linearly polarized light produced by polarizer 2209. Thereafter, the light 1103 advances toward liquid crystal display element 2200 via microprism sheet 2401.

On the other hand, light 1104 reflected on cholesteric liquid crystal film 2601 passes through the light guide 2302 and is reflected by polarization retention reflector 2304 to advance again toward cholesteric liquid crystal film 2601 passing through the light guide. At this instant, the light reflected on the polarization retention reflector 2304 is changed from its initial state of right circular polarized light 1104 to left circular polarized light, i.e., the direction of rotation is reversed, and thus it is allowed to pass through cholesteric liquid crystal film 2601. Then, the light is converted into a linearly polarized light by retardation film 2501, the direction of oscillation of the electric vector of which is set identical with the axis of transmittance of the linearly polarized light produced by polarizer 2209, and, thereafter, the light enters liquid crystal display element 2200.

Namely, non-polarized light emitted from light source 2301 is converted most efficiently into a desired linearly polarized light, and then it is irradiated on liquid crystal display element 2200. Thereby, light which is to enter the liquid crystal display element 2200 is not absorbed in polarizer 2209 and in its transmittance thereby contributes fully to the display. Components of light absorbed and lost in the polarizers of the conventional liquid crystal display elements can be utilized efficiently according to the invention.

The light which enters the liquid crystal display element 2200 is modulated in accordance with picture information, and then enters the wavelength converter 2100.

Wavelength converter 2100 is comprised of green light fluorescent material 2102G which absorbs blue light emitted by the light source and emits green fluorescence light, red light fluorescent material 2101 R which absorbs blue light and emits red fluorescence light, and blue light color filter 2103B which passes blue light but cuts off other wavelengths of light. These fluorescent materials and the color filter are provided in patterns corresponding to respective pixels of respective colors of light, and the liquid crystal display element 2200 is provided merely as a light shutter for selectively passing blue light, and its color display is effected by fluorescence of fluorescent materials and/or color filters arranged corresponding to the pixels through which blue light has passed.

Fluorescent colors are determined by the characteristics of the respective fluorescent materials, and vivid color displays of red and green have been realized. Further, as for the blue color filter, because the light source used here emits blue light, there occurs almost no loss of light, thereby a vivid blue color display.

As described hereinabove, according to the color display device of the invention, which utilizes a blue light emission light source for emitting a narrow band monochrome blue light, a predetermined linearly polarized light can be obtained most efficiently compared to the white light that has a broad band of emission spectra. This linearly polarized light for irradiating the liquid crystal display element is obtained by converting the circularly polarized light into a linearly polarized light that has the direction of oscillation of its electric vectors identical with the axis of transmittance of the linearly polarized light of the polarizer which is disposed on the back surface of the liquid crystal display element. Therefore, light which is caused to enter the liquid crystal display element is not absorbed in the polarizers and can contribute wholly to the purpose of the display. Therefore, components of light absorbed and lost in the polarizers of the conventional liquid, crystal display elements can be utilized most effectively according to the invention.

The liquid crystal display element according to this embodiment of the invention functions merely as an optical shutter for selectively passing blue light from the light source, and green and red colors are displayed vividly by fluorescent light produced by fluorescent materials which are patterned at respective positions corresponding to respective pixels of respective colors. Further, a blue color is displayed vividly by light passing through the blue color filter which is patterned at a position corresponding to a pixel of the blue color without loss of light because of the provision of a monochrome blue light emission light source. Thereby, a vivid color display device featuring no loss of light by the color filters, such as is observed in the prior art color liquid crystal display device, as well as a high efficiency light utilization and improved brightness, has been provided.

Still further, in the color display device according to this embodiment of the invention, the illumination light emitted from the illumination apparatus is collimated relative to omni-directions by the inclined reflecting corrugations provided on the back (bottom) surface in the light guide and the microprism array. Therefore, even if the liquid crystal layer of the liquid crystal display element and the fluorescent materials in the wavelength converter are separated at a distance by the glass substrate, stray light from any pixel which reaches another fluorescent material different from its destined fluorescent material which corresponds to any pixel can be minimized by the collimation of the light. Thereby, color bleeding and a decrease in resolution can be suppressed, thereby advantageously providing for a high quality color display device.

Still further, because the excitation light (emission of the light source) for fluorescent light emission is visible light, it is not absorbed in various transparent materials commonly used in the liquid crystal display elements as ultraviolet light is absorbed, thereby ensuring that the light source emission will be utilized efficiently. Still more, because there occurs no material deterioration in the polarizers and liquid crystals due to exposure to ultraviolet light, a long service life fluorescent color display can be realized advantageously.

Still more, by addition of a light dispersion film having a large frontal light dispersion on the blue color filter at the side facing the viewer, a uniform blue light having a uniform spatial distribution which does not depend on the direction of incidence of light (an be obtained advantageously. As for display of red and green colors, because a spatial distribution of fluorescence of the fluorescent materials is inherently uniform without depending on the direction of incidence of light, a vivid display of red and green colors can be obtained without dependency on the viewing angle.

By way of example, if the blue light from the light source has a high color purity emission spectrum, the blue color filter of the wavelength converter is not always necessary, and may be omitted. Still more, any one of the illumination apparatuses according to the embodiments 1–7 of the invention may be adopted for this embodiment 12 of the invention.

Embodiment 13

Figure 31:
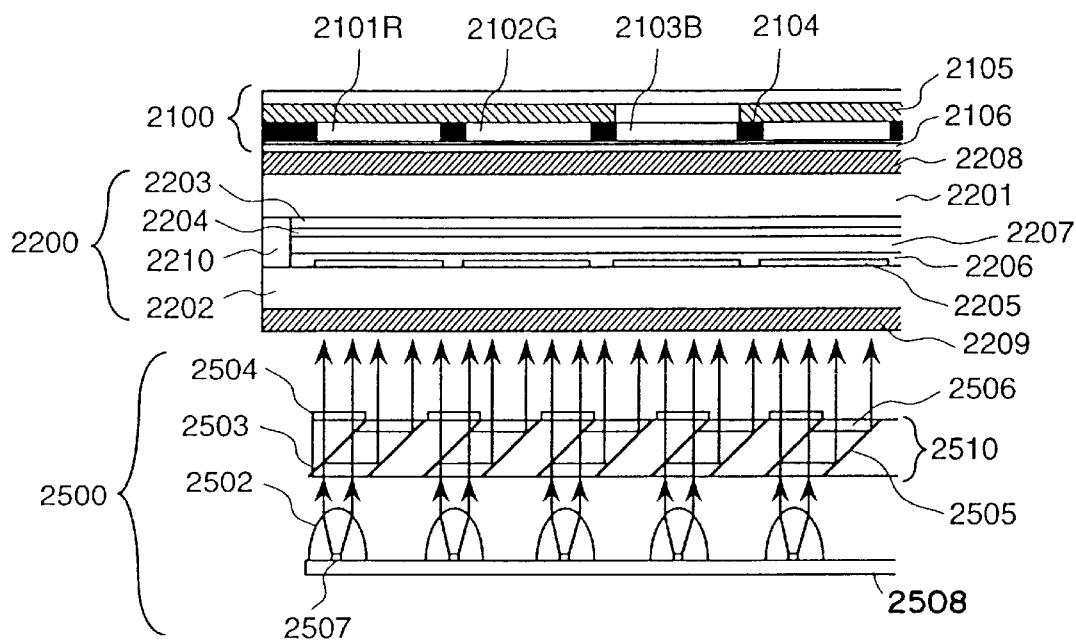
FIG. 31 is a schematic cross-section in part of a color display device according to one embodiment of the invention.

Another color display device according to embodiment 13 of the invention will be described with reference to FIG. 31, which is a schematic diagram in part of another color display device according to the invention.

A major difference of this embodiment 13 of the invention from the embodiment 12 described above using FIGS. 19, 21 and 22 resides in the fact that its illumination apparatus is modified. Therefore, the same components and parts of the liquid crystal display element 2200 as in the embodiment 12 are labeled with the same symbols, and a detailed description thereof will be omitted.

Illumination apparatus 2500 according to this embodiment of the invention is comprised of a plurality of blue light LEDs 2507 disposed in alignment on a member 2503; a plurality of collimator lenses 2502 each for collimating light: emitted from a respective blue light LED 2507; and a polarization splitter prism array 2510. The polarization splitter prism array 2510 includes a plurality of polarization splitters 2503 each for splitting light emitted from a respective blue light LED 2507 into two types of linearly polarized rays of light, each having a direction of oscillation of electric vectors orthogonal to each other, by reflection and transmittance; a plurality of reflectors 2505 for reflecting a linearly polarized light reflected on the polarization splitter 2503 in a direction parallel to a direction of propagation cuff a linearly polarized light that has passed through polarization splitter 2503, wherein a plurality of the polarization splitters 2503 and the reflectors 2505 are arranged alternatively via transparent material 2506; and a polarization converter element 2504 which, by converting a polarization state of at least one of the two different linearly polarized light split by the polarization splitter 2503, aligns the same into a linearly polarized light emitted from the polarization splitter prism array 2510, which has the direction of oscillation of its electric vectors aligned identical with the axis of transmittance of the linearly polarized light of polarizer 2209 that is disposed on the back surface of the liquid crystal display element 2200.

Blue light LED 2507 can be any type that emits a blue light having an emission peak wavelength from 400 to 500 nm. However, in consideration of the transmittance spectrum of the polarizers (refer to FIG. 29) and color purity of blue light from the light source, it is preferable to use a blue light LED having an emission peak wavelength from 430 to 480 nm.

Collimator lens 2502 has a function to collimate dispersion light emitted from blue light LED 2507, and a lens is disposed for each one of the plurality of blue light LEDs 2507. In this regard, there are available on the market LED lamps having a built-in transparent lens and such units provide an improved directivity, i.e., an enhanced collimation of emission; therefore, this type of unit may be used as an integration of the blue light LED 2507 and the collimator lens 2507.

More specifically, a commercially available product NSPB300A, NSPB500A (Nichia Chemical KK) may be used. In this case, a highly collimated light having a peak emission wavelength of 470 mn, a half value width of emission spectrum at 30 nm, and a half value angle of approximately ±7.5 degrees can be obtained. Still further, if a product EIL51-3B (Toyoda Synth. KK) is used, a highly collimated emission having a peak emission wavelength of approximately 470 nm, a half value width of emission spectrum at about 35 nm and a half value angle of approximately ±0.5 degrees can be obtained.

Polarization split prism array 2510 is comprised of polarization splitter 2503 for splitting the light emitted from blue light LED 2507 into two types of linearly polarized rays of light each having a different direction of oscillation for its electric vectors orthogonal to each other, effectuated by reflection and transmittance; and reflectors 2505 for reflecting the light reflected on polarization splitter 2503 in a direction parallel with the direction of propagation of the linearly polarized light of another type that has passed through the polarization splitter 2503, wherein a plurality of them are arranged alternately via a transparent material 2506 having a cross section in the shape of a column parallelogram.

Transparent member 2506 is made of a material which is transparent to the emission spectrum of the light source and has no birefringence, for example, a nitrate such as BK-7 or the like. Transparent member 2506 has the shape of a column parallelogram as seen in cross-section, having an internal angle of 45 degrees. A plurality of transparent members 2506 are bonded sequentially to appear like a plane on the interface of the transparent members 2506, there are formed polarization splitter 2503 and reflector 2505 alternately.

Polarization splitter 2503 is comprised of a dielectric lamination film. In general, the number of laminations of the dielectric layers of the polarization splitter can be reduced if band spectrum of the wavelengths of the light to be split is narrow enough, thereby reducing the cost of manufacture. Further, if the band spectrum of the wavelengths of the light to be split is narrow, it becomes substantially easier to improve its polarization splitting performance accordingly such that a dependency on an angle of incidence of its polarization splitting capability will be minimized. Thereby, for the color display device according to the invention, because of the provision of the monochrome blue light from the light source and the narrow emission spectrum in terms of the half value widths from 30–35 nm, a low-priced and a higher performance polarization splitter compared to the conventional one suited for a white light source is easily provided.

Reflector 2505, which is provided for reflecting the light reflected on polarization splitter 2503, may be implemented by the same dielectric lamination film as used for polarization splitter 2503 or by a metal thin film such as Al, Ag.

Polarization converter 2504 operates to change the state of polarization of at least one of the two different linearly polarized rays of light split by polarization splitter 2503, and to cause its linearly polarized light, which is to be emitted from polarization split prism array 2510, to have the direction of oscillation for its electric vectors aligned identical with the axis of transmittance of the linearly polarized light of the polarizer 2209 disposed on the back of the liquid crystal display element 2200.

In this embodiment of the invention, polarization converter element 2504 is implemented by a phase retardation film that is selectively arranged in part on the emission surface of the polarization split prism 2510. The retardation film functions as a half wave plate with respect to the emission spectra of the light source.

In general, as for the transparent materials used for the retardation film, the index of refraction has a dependency on wavelength (has a wavelength dispersion), therefore, a sufficient performance cannot be obtained by provision of one layer of one species. Thereby, two types of retardation films each having a different wavelength dispersion are laminated by shifting each optical axis for conventional use. However, with this technique problems occur in that its performance is substantially deteriorated due to the fact that the change of retardation increases depending on the angle of incidence of light, and its cost of manufacture increases.

However, according the color display device of the invention, because the band of wavelengths of emission of the blue light LED 2507 which is used as the light source is sufficiently narrow, such as 30 to 35 nm in terms of the half value widths, one layer of film of one species is adequate to satisfy its function, thereby easily implementing a high performance polarization splitter.

The half wave retardation film may be disposed on either portion on the emission surface of polarization split prism 2501 from which the light that has passed polarization splitter 2503 is emitted or its other surface from which the light that is reflected on polarization splitter 2503 and further on reflector 2505 is emitted.

In the following description of the polarization converter element (half wave plate), consideration will be given by way of example to where the polarization converter 2504 is disposed on the portion from which the light which has passed through polarization splitter 2503 is emitted.

Figure 32:
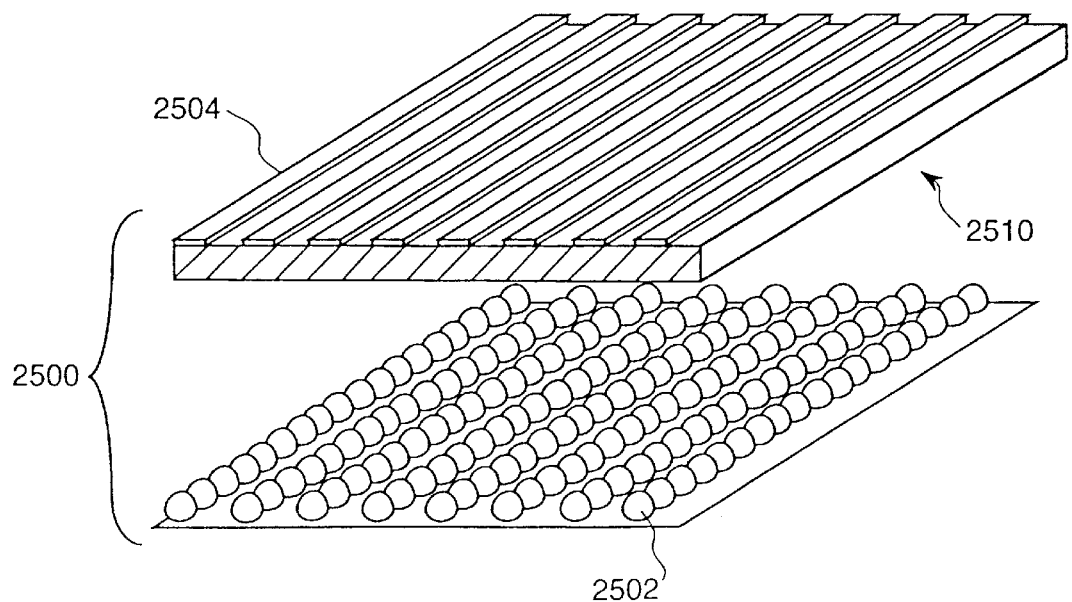
FIG. 32 is a perspective view of a schematic arrangement of an illumination apparatus according to the invention.
Figure 33:
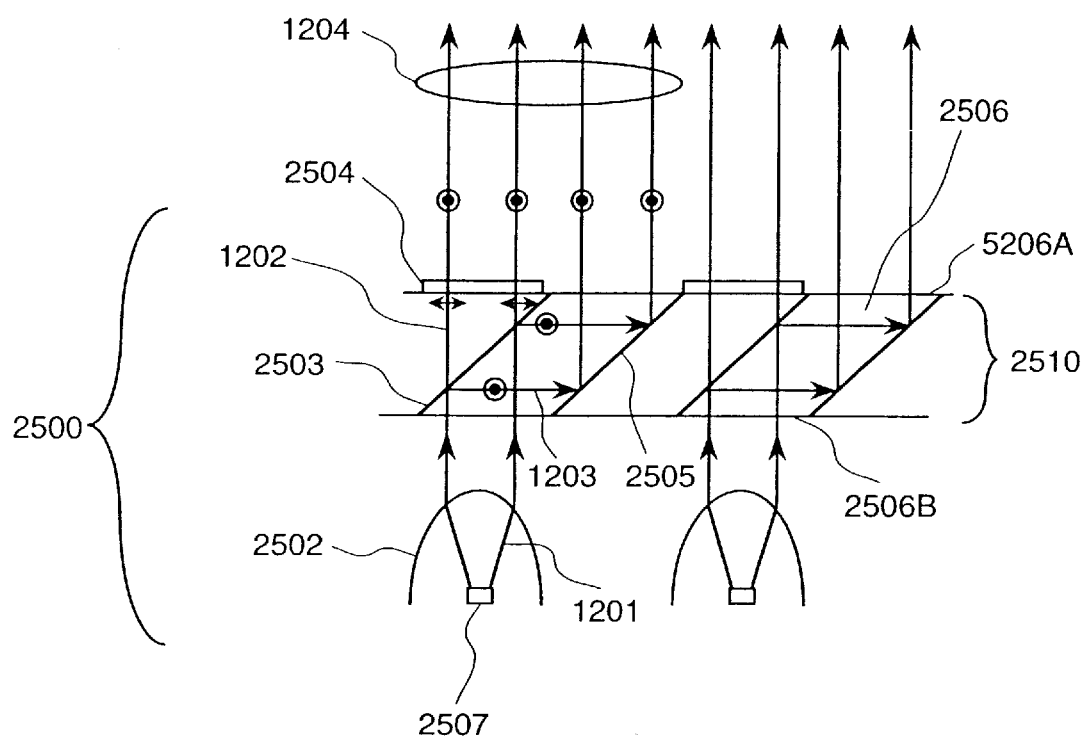
FIG. 33 is a schematic cross-section in part of the illumination apparatus according to the invention for indicating the operation thereof

An illumination apparatus according to this embodiment of the invention is shown in FIG. 32, and a schematic diagram explaining the operation thereof is shown in FIG. 33, respectively.

Blue light 2507 and its associated collimator lens 2502 are disposed in alignment at a position directly under a center position of light incidence surface 2506B of each of the plurality of transparent members 2506 constituting the polarization split prism array 2510, namely, the position thereof corresponds to a position directly under a center position of the interface of bonding of transparent member 2506.

In this case, a plurality of blue color LEDs 2607 and a plurality of collimator lenses 2502 are arranged linearly and continuously in a longitudinal direction of the transparent members 2506, and they are arranged at a distance of one line of transparent members 2506 in a perpendicular direction orthogonal to the longitudinal direction thereof Further, polarization splitter 2503 and reflector 2505 are formed alternately on the interface of bonding of transparent members 2506; however, on the interface portion thereof directly above blue color LED 2507 and collimator lens 2502, polarization splitter 2503 is disposed so as to be aligned with the blue color LED and the collimator lens.

Still further, on a portion on the emission surface 2506A of transparent material 2506 of polarization split prism array 2510, from which the light which has passed through polarization splitter 2503 is emitted, that is, the portion directly corresponding to the LED 2507 and collimator lens 2502 thereabove, there is provided the polarization converter element (half wavelength plate) 2504.

According to this arrangement of the invention, light 1201 emitted from blue color LED 2507 is collimated by collimator lens 2502, then enters polarization split prism array 2510. The light entered into polarization split prism array 2510 is split into two different linearly polarized rays of light by polarization splitter 2503 as a reflection light and a transparent light, respectively, each having a different direction of oscillation in their electric vectors.

Light 1202 having passed through polarization splitter 2503 is subjected to polarization converter element (half wavelength film) 2504 so as to become linearly polarized light, the oscillation direction of the electric vector of which is rotated by 90 degrees, namely, to become the same linearly polarized light as the light 1203 which is reflected on polarization splitter 2503. Further, the light 1203 reflected on polarization splitter 2503 is further reflected on reflector 2505, and is emitted in the same direction parallel with the light 1202 which has passed through polarization splitter 2503. Namely, according to the illumination apparatus of the invention, non-polarized light emitted from blue color LED 2507 is split into two different linearly polarized light components, and can be irradiated on liquid crystal display device 2200 as a planar illumination light of specifically aligned linearly polarized light 1204. non-polarized light emitted from blue color LED 2507 is split into two different linearly polarized light components, and can be irradiated on liquid crystal display device 2200 as a planar illumination light of specifically aligned linearly polarized light.

Here, in the color display device according to the invention, the axis of transmission of linearly polarized light in polarizer 2209 disposed on the back of liquid crystal display element 2200 is aligned identical with the oscillation direction of the electric vector of the linearly polarized light emitted from illumination device 2500.

By provision of such arrangements as described above, the non-polarized light emitted from light source 2507 is ensured to be converted efficiently into a predetermined linearly polarized light (the oscillation direction of which electric vector is aligned identical with the axis of transmittance of the linearly polarized light of polarizer 2209), and then the thus linearly polarized light is irradiated on liquid crystal display element 2200. Therefore, the light is ensured to be able to contribute to the purpose of the display without being absorbed in polarizer 2209. Thereby, the components of light absorbed and lost in the polarizer of the conventional liquid crystal display element can be utilized most efficiently according to the invention.

The light which has entered into liquid crystal display element 2200 is modulated in accordance with picture information, and then enters wavelength converter 2100.

Wavelength converter 2100 is comprised of green color fluorescent material 2102G which absorbs blue light and emits a green color fluorescence; a red color fluorescent material 2101R which absorbs blue light and emits a red color fluorescence; and a blue color filter 2103B which cuts off wavelengths of light other than for the color blue in connection with band pass filter 2105 and reflection layer 2106. These fluorescent materials and blue color filters are formed in a pattern corresponding to respective pixels of respective colors, and liquid crystal display element 2200 functions merely as an optical shutter for selectively passing the color blue. Therefore, the color display according to the invention is by fluorescence of fluorescent materials disposed at respective positions corresponding to respective pixels through which the blue light has passed, and/or by the blue color which has passed the blue color filter.

According to this embodiment 13 of the invention, a high performance bright color display device featuring an enhanced light utilization efficiency can be implemented in the same manner as in the embodiment 12 of the invention because the components of light previously absorbed and lost in the polarizer or color filter can be utilized most efficiently.

Still further, because the excitation light (of the light source) for exciting the fluorescent display is a visible light, there occurs no deterioration in the materials of the polarizers and liquid crystals as occurs when they are exposed to ultraviolet light, thereby providing for a long service life fluorescent color display. Thereby, the same advantages and effects as obtained in the preceding embodiments can be obtained.

Still further, the light emitted from the illumination apparatus in the color display device according to the invention is from a blue light LED, which is a very small light source, and is collimated by the collimation lens into a highly collimated light. Thereby, even though the liquid crystal layer of the liquid crystal display element and the fluorescent materials in the wavelength converter are separated by the glass substrate at a remote distance, a stray light to a fluorescent material different from the fluorescent material of the target corresponding to the pixel being addressed is minimized, thereby advantageously suppressing occurrences of color bleeding and deterioration of a resolution.

By provision of the inclined collimation device at the light incidence portion of the light guide in the illumination apparatus of the invention, a thin and compact illumination apparatus which features a high light utilization efficiency and a high collimation performance is provided. Further, an improved brightness liquid crystal display device using this illumination apparatus is provided. Furthermore, a wide viewing angle liquid crystal display device is provided by provision of a screen for spreading the light on the liquid crystal display element. Alternatively, by use of a light source for emitting a monochrome light, by provision of fluorescent materials corresponding to respective colors on the liquid crystal display element and by causing these fluorescent materials selectively to emit respective colors of fluorescence, a high brightness and wide viewing angle for the display is realized.

Still further, by provision of light source that emits blue light, the light emitted therefrom and to be modulated in the liquid crystal display element is provided as a monochrome blue light having a narrow band spectrum. Therefore, the performance of the polarization splitter and the polarization converter can be improved substantially compared to performance obtained using white light that has a broader band of spectrum. Thereby, the non-polarized light from the light source can be converted more efficiently than the prior art into the preferred linearly polarized light that has the oscillation direction of its electric vectors aligned identical with the axis of transmission of the linearly polarized light in the polarizer which is disposed on the back of the liquid crystal display element, then to irradiate the liquid crystal display element. Therefore, the light incident on the liquid crystal display element is not absorbed in the polarizer and can contribute fully to the purpose of the display. Thus, the components of light conventionally absorbed and lost in the polarizer of the liquid crystal display element can be utilized most efficiently.

Still more, the liquid crystal display element functions merely as an optical shutter for selectively passing the blue light from the light source, and display of the green and red colors is effected by fluorescence of the fluorescent materials disposed in a pattern corresponding to respective pixels of respective colors. Further, the display of the blue color is effected by the light transmitted light through the blue color filter, which is patterned at a position corresponding to a pixel of the blue color. It is noted that because the light source emits a blue light, there occurs no loss of light in the blue light filter. Thereby, a bright color display device featuring an improved light utilization efficiency by eliminating light absorption in the color filter in the prior art color liquid crystal display device is provided.

Still further, the light emitted from the illumination apparatus is advantageously collimated according to the invention whether the light source is a fluorescent lamp or is formed of LEDs. In the former case, where a fluorescent lamp is used, the light is collimated in omnidirections by the inclined reflecting corrugations formed on the bottom surface in the light guide and by the microprism array, and in the latter case, where LEDs are used, the light is collimated by a collimator lens. Therefore, in both cases, even though the liquid crystal layer of the liquid crystal display element and the fluorescent materials in the wavelength converter are separated by a glass substrate at a remote distance, the amount of stray light which reaches a fluorescent material different from a fluorescent material of a target disposed corresponding to a pixel being addressed for display is minimized, thereby suppressing the occurrences of color bleeding and deterioration of resolution, and thereby providing for a high performance color display.

Furthermore, because the excitation light (light source) for use in a fluorescent display is visible light, it is not absorbed as ultraviolet light in various materials commonly used in the liquid crystal display element, thereby advantageously providing for a long service life fluorescent color display that features an improved light utilization efficiency, and elimination of deterioration of the polarizers and liquid crystal due to exposure to ultraviolet rays.

Still more, by provision of a light dispersion layer having a large frontal dispersion in front of the blue color filter on the side facing the viewer, a uniform blue color in a uniform spatial distribution with no dependency on the angles of incidence of light can be attained. As for the red and green colors, because the spatial distribution of fluorescence of the fluorescent materials is inherently uniform with no dependency on the directions of the incident light, a high performance color display having no dependency on the viewing angle can be attained advantageously.

Still further, by provision of a band pass filter that selectively passes emission spectra of fluorescence of the red color and the green color fluorescent materials and absorbs the other emission spectra at a portion on the surface of the wavelength converter (toward the viewer) except for the portion of the blue color filter, namely, where the fluorescent materials are pattern-formed, excitation light contained in the external light in the day-light or illuminated environments will be absorbed by the band pass filter, thereby advantageously eliminating the occurrence of fluorescent excitation of the fluorescent materials by external light such that the brightness of the color black increases. Further, the red and the green colors produced by fluorescence of the fluorescent materials are allowed to pass through the band pass filter without absorption, and the blue light is allowed to pass without absorption through the blue color filter in which no band pass filter is provided so as to be able to contribute fully to the purpose of the display. Thereby, a bright color display featuring a high contrast ratio even under daylight conditions or an illuminated environment is obtained.

Furthermore, by provision of a reflecting film on the back of the wavelength converter (toward the liquid crystal display element) that allows the emission spectra of the light source (blue light) to pass and reflects the other visible light, a return of dispersed light of fluorescence from the fluorescent materials to the liquid crystal display element to cause a loss of light, or a stray light therefrom to cause color bleeding or deterioration of the quality of the display, can be eliminated according to the invention, thereby providing for a bright and high quality color display device.

What is claimed is:

1. An illumination arrangement comprising: a light guide having a lower surface opposite to a light emission surface thereof, the lower surface and the light emission surface of the light guide intersecting one another across a mating edge, a reflector having inclined irregularities or corrugations disposed with respect to the lower surface of said light guide so as to reflect light in a direction toward the light emission surface, said inclined irregularities or said corrugations being specular finished; a collimator provided adjacent at least one side of said light guide for collimating light incident on said light guide; a light source juxtaposed to said collimator; and a light source reflector which surrounds said light source.

2. An illumination arrangement comprising a plurality of illumination apparatuses, each comprising: a light guide having a lower surface opposite to a light emission surface thereof, the lower surface and the light emission surface of the light guide intersecting one another across a mating edge, a reflector having inclined irregularities or corrugations disposed with respect to the lower surface of said light guide as to reflect light in a direction toward the light emission surface, said inclined irregularities or said corrugations being specular finished; a collimator provided adjacent at least one side of said light guide for collimating light incident on said light guide; a light source juxtaposed to said collimator; and a light source reflector which surrounds said light source.

3. An illumination arrangement comprising a plurality of illumination apparatuses, each comprising: a light guide having a lower surface opposite to a light emission surface thereof, the lower surface and the light emission surface of the light guide intersecting one another across a mating edge, said light guide including a plurality of grooves provided on the light emission surface of said light guide, each groove having an inclined plane which is specular-finished; a collimator provided at least: on one side of said light guide for collimating light incident on said light guide; a light source juxtaposed to said collimator; and a light source reflector which surrounds said light source.

4. An illumination arrangement comprising a plurality of illumination-apparatuses, each comprising: a light guide for emitting light therefrom in a band of rays of emission, said light guide having a lower surface opposite to a light emission surface thereof, the lower surface and the light emission surface of the light guide intersecting one another across a mating edge, a reflector having inclined irregularities or corrugations disposed with respect to the lower surface of said light guide as to reflect light in a direction toward the light emission surface thereof, said inclined irregularities or said corrugations being specular finished; a polarization converter provided on said light guide; a collimator provided at least on one side of said light guide for collimating light incident on said light guide; a light source juxtaposed to said collimator; and a light source reflector which surrounds said light source.

5. An illumination arrangement comprising a plurality of illumination apparatuses, each comprising: a light guide having a lower surface opposite to a light emission surface thereof, the lower surface and the light emission surface of the light guide intersecting one another across a mating edge, said light guide including grooves formed in a light emission surface thereof, each groove having an inclined plane which is specular-finished for reflecting and emitting light in a band of rays of emission; a polarization converter provided adjacent said light guide; a collimator provided adjacent at least one side of said light guide for collimating light incident on said light guide; a light source juxtaposed to said collimator; and a light source reflector surrounding said light source.

6. An illumination arrangement according to any one of claims 1–5, wherein said collimator has an optical axis which is inclined relative to said light emission surface of said light guide.

7. An illumination arrangement according to any one of claims 1–5, wherein said light source is a cylindrical light source, and wherein said collimator has a first opening on a side thereof at least along a longitudinal direction of said cylindrical light source and a second opening on the side thereof facing said light guide, and a third opening in a center portion of said light guide which is narrower than the first and second openings.

8. An illumination arrangement according to any one of claims 1–5, wherein said light source is a cylindrical light source, and wherein said collimator has a first opening on a side thereof at least along a longitudinal direction of said cylindrical light source and a second opening on the side thereof facing said light guide, and a third opening in a center portion of said light guide which is narrower than the first and second openings, and wherein said collimator further has a light reflection surface provided partly on a wall of said wide opening facing said light source.

9. An illumination arrangement according to any one of claims 1–5, wherein said light source is a spot light source, said spot light source being disposed corresponding to each collimator, and wherein said collimator has an opening on the side thereof facing said light guide which is broader than an opening on the side which does not face said light guide.

10. An illumination apparatus according to any one of claims 1–3, further comprising a polarization converter interposed between said collimator and said light guide, wherein said light guide is a cylindrical light source, and said collimator has a first opening on a side thereof along a longitudinal direction of said cylindrical light source and a second opening on a side facing said light guide, and a third opening at a center portion of said collimator which is narrower than the first and second openings.

11. An illumination arrangement according to any of claims 1–3, further comprising a polarization converter interposed between said collimator and said light guide, wherein said light source is a spot light source, said spot light source being disposed for each one of said collimators, and wherein said collimator has an opening on the side thereof facing said light guide.

12. A liquid crystal display device provided with the illumination arrangement according to any one of claims 1–5 for displaying a picture through control of a polarization state, modes of scattering/transmittance, or absorption/transmission of light.

13. A liquid crystal display device according to claim 12, further comprising a screen disposed on the side of a display of said liquid crystal display device for spreading light of emission.

14. A liquid crystal display device according to claim 12, comprising a screen disposed on the side of display of a said liquid crystal display device for spreading light of emission and for absorbing external light and oblique incidence of light.

15. A liquid crystal display device according to claim 12, comprising a focus unit, a magnifying unit and a screen provided on the side of a display of a said liquid crystal display device.

16. A liquid crystal display device according to claim 12, wherein said light source emits a light the wavelength of which is 500 nm or less, and wherein phosphors that produce fluorescence light by irradiation by said light source are provided on the side of display of a said liquid crystal display element.

17. A liquid crystal display device comprising the illumination arrangement according to any one of claims 1–5 comprising: a liquid crystal display element which includes: a pair of transparent substrates spaced at a small distance, having transparent electrodes formed thereon counter-positioned to each other; a liquid crystal layer interposed between said pair of transparent substrates; and a voltage application device for applying a voltage in response to a picture signal to a pixel in a matrix formed by said transparent electrodes on said pair of transparent substrates; a light source which emits light having a peak emission wavelength from 380 to 500 nm for illuminating said liquid crystal display element from a back side thereof; and a wavelength converter disposed on an emission side of the liquid crystal layer of said liquid crystal display element, comprising phosphors of more than one species for converting light from said light source into a red or green light, said phosphors being arranged corresponding to respective pixels of said liquid crystal display element, wherein said liquid crystal display element has a polarizer disposed at least on the side of its light incidence such that a state of polarization of light which enters the liquid crystal layer is most efficiently utilized for the purpose of display.

18. A liquid crystal display device having the illumination arrangement according to any one of claims 1–5 disposed as a back light thereof, comprising: a liquid crystal display element which includes: a pair of transparent substrates, having transparent electrodes formed thereon so as to be counter-positioned and being spaced from each other by a small distance; a liquid crystal layer interposed between said pair of transparent substrates; and a voltage application device for applying a voltage in response to a picture signal to a pixel formed in a matrix by said transparent electrodes on said pair of transparent substrates; further comprising a light source which emits a light having a peak emission spectrum of 430–480 nm for illuminating said liquid crystal display element as a back lighting; and a wavelength converter comprising phosphors of more than one species arranged corresponding to respective pixels of said liquid crystal display element and disposed on the side of light emission of said liquid crystal layer for converting the light from said light source into a red or green colors, wherein said liquid crystal display element has a polarizer disposed on a light incidence side thereof for utilizing most efficiently the incidence light for the purpose of display by controlling a state of polarization thereof.

19. A liquid crystal display device having the illumination arrangement according to any one of claims 1–5 disposed as a back light thereof, comprising: a liquid crystal display element which includes: a pair of transparent substrates having transparent electrodes formed thereon so as to be counter-positioned to each other, the substrates being spaced by a small distance; a liquid crystal layer interposed between said pair of transparent substrates; and a voltage application device for applying a voltage in response to a picture signal to a pixel formed in a matrix by said transparent electrodes on said pair of transparent substrates; further comprising a light source which emits a light having a peak emission spectrum of 380–500 nm for illuminating said liquid crystal display element as a back lighting; and a wavelength converter comprising phosphors of more than one species arranged corresponding to respective pixels of said liquid crystal display element and disposed on the side of light emission of said liquid crystal layer for converting the light from said light source into a red or green colors; wherein said light source is a fluorescent lamp juxtaposed to a side of a light guide formed into a plate; and wherein said light guide has a structure to confine light which has entered from the side thereof by total reflection, and comprises an inclined reflector having a plurality of small irregularities or corrugations provided on a lower surface opposite to an emission surface of said light guide for emitting a collimated light therefrom, said collimated light being collimated at least in one direction by a change of a direction of its propagation on the reflector; and further wherein a cholesteric liquid crystal film is interposed between said light guide and said liquid crystal display element as a polarization splitter, a retardation film is interposed between said cholesteric liquid crystal film and said liquid crystal display element as a first polarization converter, and a reflecting surface is provided in a lower direction of said light conductor as a second polarization converter for reflecting a portion of light reflected on said cholesteric liquid crystal film once again toward said cholesteric liquid crystal film such that at least a circularly polarized light which has entered in a vertical direction is reflected as a circularly polarized light having its direction of rotation reversed.

20. A liquid crystal display device according to claim 19, further comprising an optical path converter disposed between said light guide and said liquid crystal display element for converting non-polarized light at least in one direction into collimated light, wherein said optical path converter is disposed such that a direction of its optical conversion becomes orthogonal to a direction of said collimated light.

* * * * *